US011670042B2

(12) United States Patent
Boubekeur et al.

(10) Patent No.: US 11,670,042 B2
(45) Date of Patent: Jun. 6, 2023

(54) LEARNING MATERIAL RECONSTRUCTION FROM A SINGLE IMAGE

(71) Applicant: ADOBE INC., San Jose, CA (US)

(72) Inventors: Tamy Boubekeur, Paris (FR); Adrien Michel Paul Kaiser, Grenoble (FR); Rosalie Noémie Raphaële Martin, Lyons (FR); Romain Pierre Henri Rouffet, Lyons (FR); Arthur Jules Martin Roullier, Paris (FR)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/201,721

(22) Filed: Mar. 15, 2021

(65) Prior Publication Data

US 2022/0292762 A1 Sep. 15, 2022

(51) Int. Cl.
| | |
|---|---|
| *G06T 15/50* | (2011.01) |
| *G06T 11/60* | (2006.01) |
| *G06T 15/04* | (2011.01) |
| *G06N 3/08* | (2023.01) |
| *G06T 15/60* | (2006.01) |
| *G06F 18/214* | (2023.01) |
| *G06N 3/045* | (2023.01) |

(52) U.S. Cl.
CPC .......... *G06T 15/506* (2013.01); *G06F 18/214* (2023.01); *G06N 3/045* (2023.01); *G06N 3/08* (2013.01); *G06T 11/60* (2013.01); *G06T 15/04* (2013.01); *G06T 15/60* (2013.01)

(58) Field of Classification Search
None
See application file for complete search history.

(56) References Cited

U.S. PATENT DOCUMENTS

| | | | |
|---|---|---|---|
| 2011/0234581 A1* | 9/2011 | Eikelis | G06K 9/00228 345/419 |
| 2021/0287342 A1* | 9/2021 | Yang | G06T 5/30 |

OTHER PUBLICATIONS

Deschaintre, Valentin, et al. "Single-image svbrdf capture with a rendering-aware deep network." ACM Transactions on Graphics (ToG) 37.4 (2018): 1-15 (Year: 2018).*
Deschaintre, Valentin, et al. "Flexible svbrdf capture with a multi-image deep network." Computer Graphics Forum. vol. 38. No. 4. 2019 (Year: 2019).*
Deschaintre, Valentin. "Material acquisition using deep learning." SIGGRAPH Asia 2019 Doctoral Consortium. 2019. 1-4. (Year: 2019).*
Asselin, Louis-Philippe, Denis Laurendeau, and Jean-François Lalonde. "Deep SVBRDF estimation on real materials." 2020 International Conference on 3D Vision (3DV). IEEE, 2020. (Year: 2020).*
Aittala, M., Aila, T., & Lehtinen, J. (2016). Reflectance modeling by neural texture synthesis. ACM Transactions on Graphics (ToG), 35(4), 1-13.

(Continued)

*Primary Examiner* — Nurun Flora
(74) *Attorney, Agent, or Firm* — Shook, Hardy & Bacon L.L.P.

(57) ABSTRACT

Various disclosed embodiments are directed to image-to-material translation based on delighting an input image, thereby allowing proper capturing of the color and geometry properties of the input image for generating a visual rendering. This, among other functionality described herein, improves the inaccuracies, user experience, and computing resource consumption of existing technologies.

19 Claims, 14 Drawing Sheets

(56) References Cited

OTHER PUBLICATIONS

Bavoil, L., Sainz, M., & Dimitrov, R. (2008). Image-space horizon-based ambient occlusion. In ACM SIGGRAPH 2008 talks (pp. 1-1).
Deschaintre, V., Aittala, M., Durand, F., Drettakis, G., & Bousseau, A. (2018). Single-image svbrdf capture with a rendering-aware deep network. ACM Transactions on Graphics (ToG), 37(4), 1-15.
Durou, J. D., & Courteille, F. (Oct. 2007). Integration of a normal field without boundary condition. In Proceedings of the First International Workshop on Photometric Analysis for Computer Vision-PACV 2007 (pp. 8-p). INRIA.
Li, Z., Sunkavalli, K., & Chandraker, M. (2018). Materials for masses: SVBRDF acquisition with a single mobile phone image. In Proceedings of the European Conference on Computer Vision (ECCV) (pp. 72-87).
Pérez, P., Gangnet, M., & Blake, A. (2003). Poisson image editing. In ACM SIGGRAPH 2003 Papers (pp. 313-318).
Qu, L., Tian, J., He, S., Tang, Y., & Lau, R. W. (2017). Deshadownet: A multi-context embedding deep network for shadow removal. In Proceedings of the IEEE Conference on Computer Vision and Pattern Recognition (pp. 4067-4075).
Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.
Wang, J., Li, X., & Yang, J. (2018). Stacked conditional generative adversarial networks for jointly learning shadow detection and shadow removal. In Proceedings of the IEEE Conference on Computer Vision and Pattern Recognition. (pp. 1788-1797).

\* cited by examiner

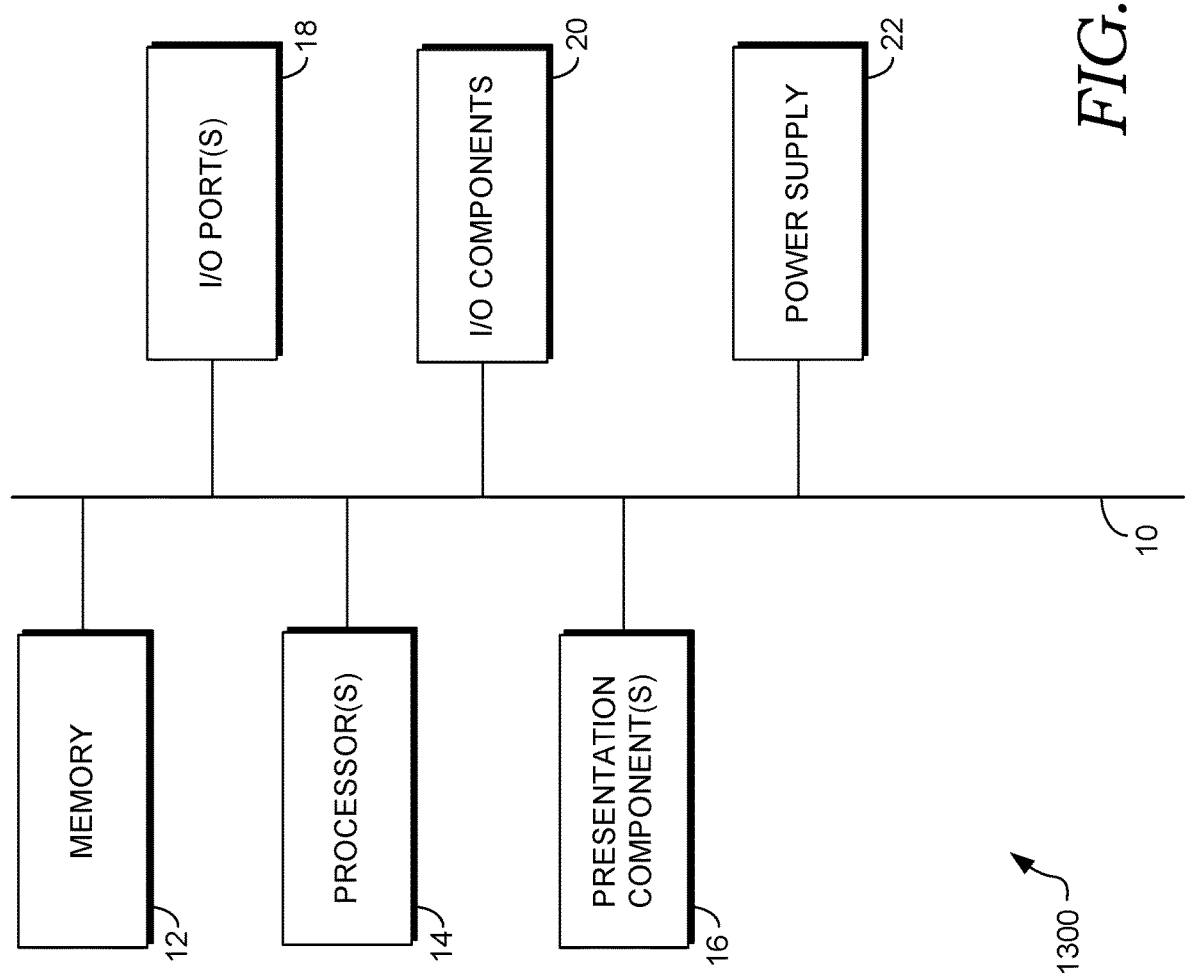

LEARNING MATERIAL RECONSTRUCTION FROM A SINGLE IMAGE

BACKGROUND

Various technologies render media (e.g., photographic images) or provide varied functionality associated with media. For example, media editing software (e.g., Adobe® Photoshop®) provide tools (e.g., cut, paste, select) to users so that they can generate or modify visual data of digital images and video. However, various software applications generally lack the functionality to adequately perform image-to-material translation tasks. Image-to-material translation is the process of converting or reconstructing an input image (e.g., a 2-D photograph) into components or objects (e.g., maps) that are used to re-compute a visual rendering of the physical material (e.g., PBR material maps in the context of 3-D Physically Based Rendering (PBR)).

Existing technologies fail to adequately perform image-to-material translation, especially when input images include heterogeneous materials, complex shading, and/or complex surface texture characteristics (e.g., multiple small pebbles with varied texture mixed with various sticks and brush, causing multiple shading characteristics). Despite advances in existing technologies, machine learning systems and other technologies suffer from a number of disadvantages, particularly in terms of their accuracy, destructive functionality, computing resource consumption, and negatively affect the user experience, among other things.

SUMMARY

One or more embodiments described herein provide benefits and solve one or more of the foregoing or other problems in existing technology with methods, systems, and non-transitory computer readable media that perform image-to-material translation based on delighting (e.g., removing shadow and highlight data) an input image, thereby allowing proper capturing of the color (or albedo) properties and geometry (e.g., normal) properties of the input image for generating a visual rendering. For instance, some embodiments perform the delighting functionality via a first U-Net machine learning model to derive a first map (e.g., an albedo map) that indicates the color properties. Using the first map, some embodiments additionally use a second U-Net machine learning model to derive a second map (e.g., a normal map) that indicates geometric features of real-world objects included in the input image. This allows various embodiments to accurately capture shadow and highlight features of an input image and remove them from an input image (or generate an albedo map) in order to accurately capture the native geometric features of objects in an input image (e.g., by generating a normal map from the shadow map). This, among other functionality described herein, improves the inaccuracies, user experience, and computing resource consumption of existing technologies.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 12 a schematic diagram illustrating an example computing environment, in which some embodiments of the present disclosure are employed in.

FIG. 13 is a block diagram of a computing device in which aspects of the present disclosure employ, according to some embodiments.

DETAILED DESCRIPTION

Overview

Figure 1:
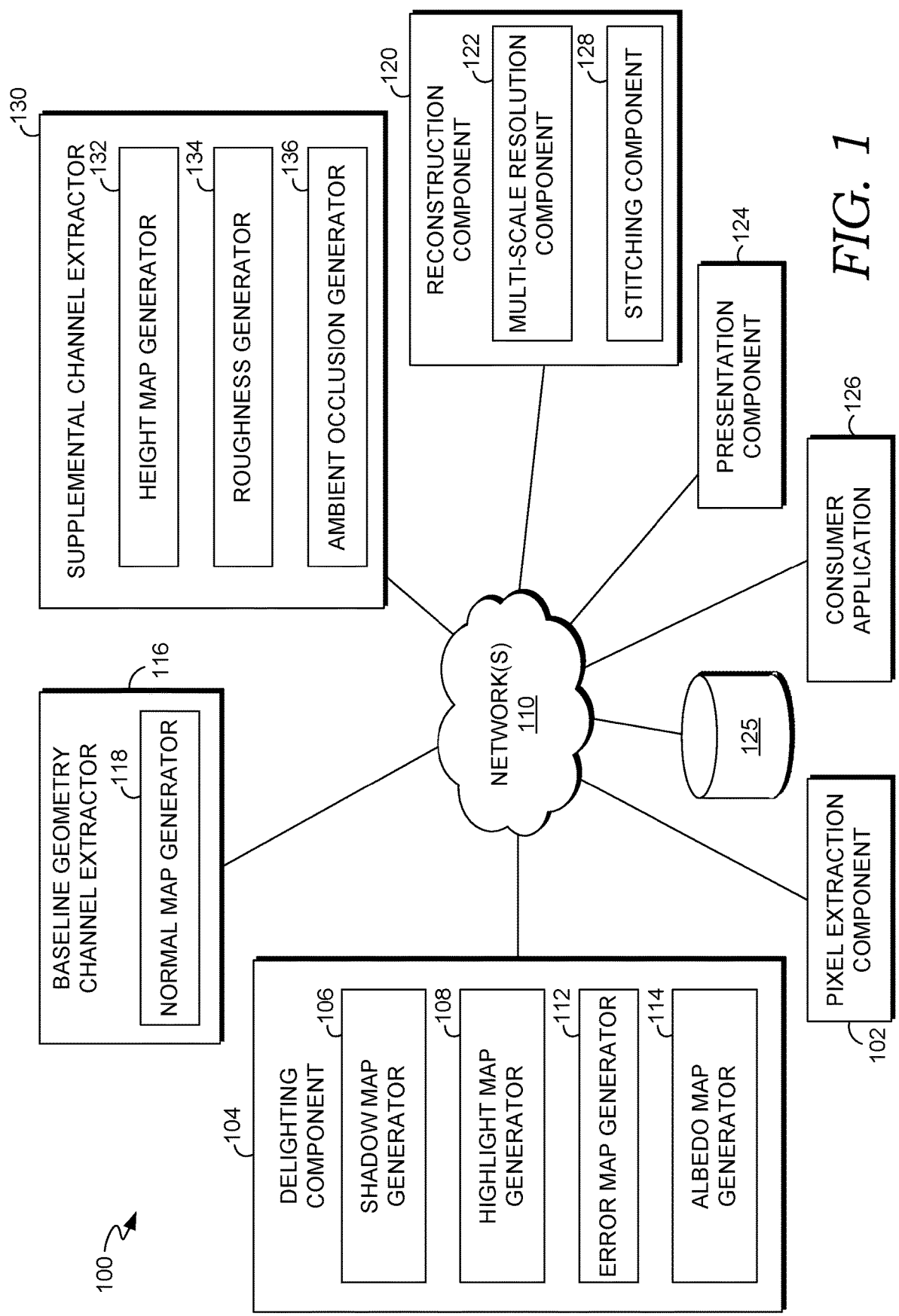
FIG. 1 is a block diagram of a computing system architecture in which aspects of the present disclosure are employed, according to some embodiments.

In various applications such as architecture models, video gaming, visual effects, and animation, among other things, it is desirable to generate realistic simulations or visual renderings of the surface appearance of real world objects. The actual surface appearance of real world objects results from complex interactions between light, reflectance, and geometry properties. Accordingly, it is desirable to generate corresponding visual renderings that replicate these properties as closely as possible.

Generating a visual rendering may include attempting to capture the real word object surface's Spatially-varying Bidirectional Reflectance Distribution Function (SVBRDF). A Bidirectional Distribution Function (BRDF) is a function used to describe the reflectance properties of a real world object surface (or how light interacts with a surface). "Spatially-varying" BRDF means that reflectance properties change across a surface, where two points on the same surface may have different reflectance properties, which affects the light reflection (e.g., intensity, absorption, or scattering), the perceived color of the object, the relief of the object, or other microscale geometric features of the object (e.g., roughness, glossiness, etc.).

Estimating the surface reflectance properties of a spatially-varying material to generate a visual rendering is a challenging technical problem in image-to-material tasks. Existing technologies fail to accurately estimate the reflectance properties of materials that would yield realistic looking visual renderings. These technologies make unwarranted assumptions on the real world object's geometry or reflectance properties (e.g., shadows, highlights, or shading) or they impose strong/static constraints on the material capture. For example, existing technologies assume that real world materials are stationary (e.g., not spatially-varying) or generate visual renderings based on generic shapes or other geometries (e.g., via training on large basic objects). Accordingly, these technologies have more difficulties in generating visual renderings that indicate irregular object geometry (e.g., sharp edges, heterogeneous materials) or varied shading characteristics and fail to reconstruct complex mesostructures (e.g., specific details in the albedo or normal), thereby making the generating of the visual renderings less accurate.

Some technologies also require the use of flash photography on an input image. However, flash photography is destructive, especially on highly specular (e.g., mirror-like reflective) materials, as the visual renderings produce saturated (e.g., overly bright or colored) areas, making it impossible or difficult for total recovery or reconstruction of the underlying material surface. For instance, saturation can cause unnatural coloring, unnatural lighting, unnatural reflections, and unnatural shadows. Accordingly, natural lighting (e.g., from the sun or lamp), natural colors, and natural shadows are often masked or otherwise are not adequately represented when flash lighting is used. This consequently affects predicting the underlying geometries (e.g., sharp edges and textures) and natural reflectance properties (e.g., color, shadows, highlights, and shading) of the real world objects, thereby negatively effecting accuracy when generating visual renderings.

Existing technologies are also deficient with respect to the user experience, such as user interface functionality. For instance, various existing technologies require manual user input to remove lighting effects of an input image, which is tedious. For example, some software technologies require expert knowledge and are not easy to set up. These technologies require extensive drilling, querying, browsing and other steps to be able to remove or change lighting of visual renderings, which is tedious. Further, manually removing lighting or otherwise changing lighting to make a visual rendering is destructive in nature because manual changes are typically made asymmetrically to only portions of the input image without regard to (or not similarly performed against) similar lighting or shading characteristics of other portions of the input image.

Existing technologies are also responsible for unnecessary computing resource consumption. For example, various existing technologies require using multiple images as input in order to generate a material. However, using multiple images can cause CPU bottlenecks, or otherwise negatively affect computing resource consumption. For example, requiring the use of multiple input images requires the memory capacity and availability to store the images. Further, each input image may have to be analyzed, thereby causing unnecessary CPU utilization and throughput reduction.

Various embodiments of the present disclosure provide various technical solutions to these problems indicated above, as well as other problems. In operation, several embodiments of the present disclosure are directed to generating a material (e.g., a SVBRDF) using a single image (e.g., a high-resolution photograph captured in natural lighting conditions). Some embodiments engage in a delighting (i.e., removing light) stage by deriving or predicting a first map (e.g., an albedo map) that indicates a portion (e.g., a tile of pixels) of an input image without a set of shadows and highlight features within the portion of the input image. For example, some embodiments use a Delighter U-Net machine learning model to derive an albedo map. Some embodiments additionally derive or predict a second map (e.g., a normal map) that indicates a set of geometric features included in the portion of the input image. For example, some embodiments use a second U-Net (a "geometry U-Net") that takes, as input, the shadow map produced by the Delighter U-Net to determine geometric features (e.g., shape, edges, texture) of the corresponding objects. In this way, these models are cascaded or otherwise work together such that information produced by the Delighter U-Net is concatenated or used to produce other maps via a geometry U-Net. Accordingly, various embodiments remove shading, shadowing, and highlighting characteristics present in an input image, which allows the accurate capturing of highly irregular surfaces geometries (e.g., sharp edges and textures) and colors that would otherwise be covered, masked, or occluded by the shading, shadowing, or highlight characteristics in the input image. Some embodiments can additionally perform other mathematical operations (e.g., normal integration, Horizon Based Ambient Occlusion (HBAO) merging) in order to derive additional maps, such as height maps, ambient occlusion maps, and the like for better representing the visual rendering.

Various embodiments of the present disclosure improve the accuracy of existing technologies. For example, various embodiments do not make unwarranted assumptions on a real world object's geometry or reflectance properties, unlike certain technologies. Rather, for example, various embodiments accurately capture shadow and highlight features of an input image and remove them from an input image (or generate an albedo map), which allows these embodiments to accurately capture the native geometric features of objects in an input image (e.g., by generating a normal map from the albedo map). Further, various embodiments do not assume that real world objects are stationary or generate visual renderings based on generic shapes or other geometries. Rather, some embodiments use models that train on highly irregular or heterogeneous materials with highly varied shadowing and highlighting characteristics (e.g., via splatting highly irregular objects on visual renderings). Accordingly, various embodiments adequately generate visual renderings that indicate irregular object geometry (e.g., sharp edges, heterogeneous materials) or varied shading characteristics and are configured for the reconstruction of complex mesostructures, thereby making the generating of the visual renderings accurate.

Various embodiments also do not require the use of flash or synthetic lighting in an input image, unlike existing technologies. In fact, in many instances, the use of naturally lighted images are preferred as input. Accordingly, the generated maps or visual renderings are not destructive because they do not produce saturated areas due to the unnatural lighting of the flash. Accordingly, natural lighting, natural coloring, and natural shadows are adequately represented, unlike existing technologies. Consequently, the predicting of the underlying geometries (e.g., sharp edges and textures) and natural reflectance properties (e.g., color, shadows, highlights, and shading) of the real world objects are more accurate, thus producing a better visual rendering.

Various embodiments also improve the user experience, such as user interface functionality. For instance, rather than requiring manual user input to remove lighting effects of an input image, which is tedious, various embodiments intelligently and automatically derive underlying maps and visual renderings available in a single user interface screenshot. This reduces the drilling, querying, browsing and other steps that need to occur to produce visual renderings. Further, automatically deriving maps and visual renderings is not destructive in nature, as the model or mathematical-based functionality causes these objects to be made symmetrically.

Various embodiments of the present disclosure improve computing resource consumption relative to existing technologies. For example, various embodiments only use a single image as input in order to generate a visual rendering. Accordingly, there are reduced CPU bottlenecks and more storage availability by not using multiple input images.

Referring now to FIG. 1, a block diagram is provided showing high-level aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1300 of FIG. 13). Alternatively, some or each of the components may be distributed among various computing devices, such as in a distributed cloud computing environment. In some embodiments, the system 100 and each of the components are located within the server and/or user device of FIG. 12, as described in more detail herein.

The system 100 includes network 110, which is described in connection to FIG. 12, and which communicatively couples components of system 100, including the pixel extraction component 102, the delighting component 104, the baseline geometry channel extractor 116, the reconstruction component 120, the supplemental channel extractor 130, the presentation component 124, the consumer application 126, and storage 125. The components of the system 100 may be embodied as a set of compiled computer instructions or functions, program modules, computer software services, logic gates, or an arrangement of processes carried out on one or more computer systems.

The system 100, described at a high level, generally operates to construct material maps from an input image of a material. Those material maps can be used to generate visual renderings of the material depicted in the original image. An "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things. A "visual rendering" as described herein refers to another image (e.g., in 2D or 3D) (e.g., an "output image"), a physically based rendering (PBR), a SVBRDF PBR a set of procedural steps, an animation, and/or other suitable media, content, or computer object. "Procedural steps" includes a set of steps or processes, executed by one or more processors, where each step adds, removes, modifies, and/or generates successive content. For example, a procedural step can include varying pixel intensity values corresponding to varying a position of a represented light source across an object representing material, which causes other pixel intensity values to change corresponding to objects representing shadings to change form or appearance based on the varying of the position of the light source. In some embodiments, procedural steps are indicative of generating a procedural shadowing, shading, and/or lighting created using an algorithm (e.g., fractal noise and turbulence functions). In some embodiments, procedural steps are pre-recorded processes that are combined so that the user can incorporate any of the pre-recorded processes, while retaining the ability to modify any one of the pre-recorded processes. "Material maps" (e.g., albedo map, normal map, roughness map) as describe herein are a set of images that encode the reflectance properties of a material (e.g., its color, its geometry, its roughness). Material maps are typically the input to a physically based rendering material or other visual rendering. A "physically based rendering" (PBR) refers to a rendering that models the flow (e.g., via a set of procedural steps) of light in the real world. PBR represents the behavior of light, shading, shadows, and surfaces of real world objects or materials.

The pixel extraction component 102 is generally responsible for extracting a set of pixels or a portion of content from a single input image. An "input image" as described herein refers to the source image for which a request is made to reconstruct one or more portions of the material maps to make a visual rendering of one or more portions of the input image. The set of pixels can be any suitable quantity or window of pixels. For example, the set of pixels can be a window (or tile) of 512×512. In some embodiments, the pixel extraction component 102 extracts multiple tiles of pixels of a single input image, which are then stitched together for reconstruction, as described in more detail below. In this way, a single input image can be split or parsed into multiple tiles of pixels, each of which are reconstructed and then stitched together. Some embodiments, reconstruct a single input image tile by tile (or pixel set by pixel set) because material reconstruction may require very high resolution images in order to yield good quality materials, which is the case when neural networks are used. In practical applications, neural networks may only be able to handle limited tile sizes due to the memory footprint of representing and storing the image or tile in all the layers of the network, specifically if the network is deep. Accordingly, some embodiments analyze an input image tile by tile (as opposed to analyzing the entire input image at once) and perform a post-processing technique to seamlessly merge or stitch the results.

The delighting component 104 is generally responsible for generating an object that represents the pixel set selected by the pixel extraction component 102 without the lighting, shadowing, and/or shading characteristics of the pixel set. For example, the delighting component 104 can generate an albedo map via the albedo map generator 114. Recovering a high quality material from a scan typically involves capturing its SVBRDF, which will later be convolved by incident virtual lighting to synthetize color responses from material. Thus it is often desired for the acquired material to be made free of any information coming from the conditions under which it was taken and the multi scale geometric components (e.g., height, normal, roughness) as well as the colorimetric components (e.g., albedo) of the material should be isolated. In various embodiments, the delighting component 104 explicitly removes lighting effects (e.g., shadows and highlights), which is destructive with respect to existing technologies, as described herein.

In some embodiments, the delighting component 104 changes pixel intensity values (e.g., filtering) that represents the shadowed, shaded and/or lighted areas (e.g., as opposed to changing or warping pixels from one location on the input image to another location on a visual representation) indicated in the input image to other pixel intensity values that match the rest of the material or objects within the input image. For example, a rock object may include a first side and a second side, and the delighting component 104 can change pixel intensity values of the first side, where the first side represents the side that has a shadow cast on the rock. In these embodiments, the pixel intensity values can be changed to match the pixel intensity values of the second side. In some embodiments, a first machine learning model, such as a deep neural network (e.g., a U-NET) is used to perform the functionality of the delighting component 104, as described in more detail below. The first machine learning model (or any machine learning model described herein) can be or include any suitable type, such as a classifier, clustering model, regression model, or any deep learning (e.g., multiple-layered neural network) model. Examples include Convolutional Neural Networks (CNN), Recurrent Neural Networks (RNN), Boltzmann machines, AutoEncoders, K-means clustering model, Siamese Neural Network (SNN), Random Forest, and the like.

The shadow map generator 106 is generally responsible for generating an object or map that indicates or predicts each set of pixels representing the shadow(s) or shaded area(s) within the selected pixels of the input image (e.g., and not the objects or materials that do not have shading). In some embodiments, such prediction is based on training a machine learning model with images rich in highlights, shadows, and/or shading, which is described in more detail below. This allows the shadow map generator 106 to accurately identify which portions of an input image indicate shadows or shading based on learning weights of shadowing features of training images.

The highlight map generator 108 is generally responsible for generating an object or map that indicates or predicts each set of pixels representing the highlighted area(s) within the selected pixels of the input image (e.g., and not the objects or materials that do not have the highlights). In some embodiments, the term "highlighted" areas refers to those areas that indicate a reflection or refraction (diffused) of light on a real world object surface in the input image over some threshold. These areas typically indicate, to one degree or another, the color of the light source, as opposed to the color of the real world material itself, thereby making materials more or less "shiny." Metallic materials, glass, or water, for example, typically include more reflective properties relative to non-metallic (e.g., wood) materials. In this example, each set of pixels representing these reflections can be learned and predicted. In some embodiments, such prediction is based on training a machine learning model with images rich in reflective (e.g., metallic) and non-reflective (e.g., non-metallic) surfaces and thus rich in reflective properties, which is described in more detail below. This allows the highlight map generator 108 to accurately identify which portions of an input image indicate highlights based on learning weights of highlighting features of training images.

The error map generator 112 is generally responsible for generating an object or map that is an "enhancer map" for the input image. In some embodiments, this map is saved in 8 bit color channel, which represents a lack of precision in the darkest areas in the input image, and lost information in the saturated areas. In some embodiments, the error map is added to the input image and configured to learn how to recover the loss of information during the training.

The albedo map generator 114 is generally responsible for generating an albedo map for pixels selected by the pixel extraction component 102 by changing pixel intensity values for those areas selected via the error map generator 112. The pixel intensity change indicates no shadowing, shading, and/or highlights for the areas selected via the error map generator 112. In other words, for example, instead of pixels representing a shadow between a ground surface and a tree as shown in an input image, the pixels may be changed to represent the solid color of the occluded portion of the tree and occluded portion of the ground surface that was previously covered in shadows. In some embodiments, the albedo map otherwise represents every pixel intensity value and orientation of pixels as indicated in the input image (or selected pixels of the input image), except for the shadows and highlights.

The baseline geometry channel extractor 116 is generally responsible for extracting a baseline geometry channel (e.g., normal) of each material or object of each selected pixel sets (from the pixel extraction component 102) of the input image. In some embodiments, extracting the baseline geometry channel includes predicting the boundaries, textures, or shapes of objects/materials within the selected pixel sets. In other words, the geometry extraction component 116 predicts one or more physical features that define a given object in an input image. In some embodiments, the geometry extraction component 116 takes, as input, particular steps performed by the delighting component 104 (e.g., the shadow map generator 106), and extracts the baseline geometry from the object generated by the delighting component 104 (e.g., based on indications received of selections made by the error map generator 112), which is described in more detail below.

The normal map generator 118 is generally responsible for generating and predicting a normal map or object for the selected pixels of the input image. A "normal" object or map indicates the dents, bumps, and/or pores and the corresponding depth of the dents/bumps/pores an object has in an input image. Normal maps or objects thus typically indicate the microstructure texture of a given material in an input image. Normal maps are typically saved in a Red-Blue-Green (RGB) format, and contain its information in X, Y, and Z axes. It is understood that any suitable map, object, or channel can be generated by the baseline geometry channel extractor 116 instead of or in addition to a normal map (e.g., roughness, opacity, etc.).

In some embodiments, the normal map generator 118 uses a second machine learning model to predict the normal map. In some embodiments, such prediction is based on training a machine learning model with images rich in texture, which is described in more detail below. This allows the normal map generator 118 to accurately identify which portions of an input image indicate particular texture features based on learning weights of texture features of training images. For example, the second machine learning model may be a deep neural network (e.g., a U-NET) to perform the functionality of the normal map generator 118, as described in more detail below.

The reconstruction component 120 is generally responsible for generating additional material maps in order to infer a visual rendering of the entire input image based at least in part on merging the objects or maps generated by the delighting component 104 and the baseline geometry channel extractor 116. As discussed with respect to the pixel extraction component 102, in various embodiments, the input image is parsed into non-overlapping tiles of pixels, each of which are analyzed via the delighting component 104 and the baseline geometry channel extractor 116. Accordingly, the stitching component 128 is generally responsible for stitching each of these tiles or pixels sets of the input image together to recover a full resolution albedo object and normal object. In some embodiments, such stitching is based on the Poisson equation, which is described in more detail below.

In some embodiments tiles are processed separately with a merging functionality to produce high-quality results on a high-resolution picture. For example, some embodiments split an input image into 512×512 pixels tiles without overlap and predict the albedo (e.g., via the delighting component 104) and normal maps (e.g., via the baseline geometry channel extractor 116) of each tile. Responsively, some embodiments stitch, via the stitching component 128, all the predicted tiles together to recover a full resolution albedo and normal, and solve the Poisson equation to remove the seams on each resulting image.

For the albedo map, some embodiments use color gradients as the guidance field, and provide the entire image borders as the boundary values for the Poisson equation, which may be solved on each color component separately. In some instances, the information of the normal map is considered as normalized vectors and are not interpolated separately on each plane or component XYZ. Some embodiments convert the normal vector into particular spherical coordinates, $\theta$ being the angle from the Z axis along XZ planes, between $-\pi/2$ and $\pi/2$ and $\delta$ being the angular distance from XZ plane. This representation leverages the fact that normal are pointing up, and avoids any modulo $2\pi$ in the gradient computation:

$$\begin{cases} x = \sin(\theta)\sin(\delta) \\ y = \cos(\delta) \\ z = \cos(\theta)\sin(\delta) \end{cases} \leftrightarrow \begin{cases} \theta = a\tan2(x, z) \\ \delta = a\cos(y) \end{cases}$$

Various embodiments compute the gradient of each special coordinate and solve the Poisson equation in this space. This removes the seams or lines visible when all the output tiles are stitched together by smoothing the gradients, and allows the acquisition of a high-resolution material (a visual rendering to be generated). This method works particularly well for the albedo because the tiles are from the same material and present a color coherence at their boundaries.

In some embodiments, the result for the normal map (e.g., generated by the normal map generator 118) depends on the portrayed features size and the seams position. In some instances, for small features the results are satisfying but with features exceeding the tile size or situated across two tiles, the ambiguity at the tile scale is high and the network can fail at recovering the geometry. Additionally, the Poisson solving can introduce gradient artifacts that lead to unwanted geometry once converted into a height map.

To mitigate this issue, some embodiments utilize the multi-scale resolution component 122. The multi-scale resolution component 122 is generally responsible for reconstructing the normal maps for the entire input image at different resolutions and then blending them together. For example, in some embodiments, the multi-scale resolution component 122 reconstructs the input image showing the normal map at a low resolution, then reconstructs the input image showing the normal map at a high resolution, and lastly blends these resolutions together. Details of this functionality is described in more detail below. This is a multi-scale approach to get the low frequency geometry information and blend later with the high frequency details. Accordingly, various embodiments downscale the input image into a unique 512×512 image to process with the network to get a low-resolution normal map. The low frequency geometry of the material is contained in this low-resolution normal, and various embodiments blend with the seamless high-resolution normal using the following formula:

$$\text{normal} = \alpha(\text{normal}_{HrHf} - \text{normal}_{HrLf}) + (1-\alpha)\,\text{normal}_{LrUp}$$

where $\alpha$ is the frequency balance, $\text{normal}_{HrHf}$ is the seamless output at the resolution of the input image. $\text{normal}_{HrLf}$ represents $\text{normal}_{HrHf}$ without high frequencies, and is obtained by downscaling up to 512×512 pixels then upscaling to the input resolution, and $\text{normal}_{LrUp}$ is the 512×512 normal up scaled to the input resolution.

The supplemental channel extractor 130 is generally responsible for generating additional objects or maps that indicate additional channels for the input image (or the selected pixels via the pixel extraction component). The height map generator 132 is generally responsible for generating a height object or map. A height map is typically used for displacement in rendering. This map adds more apparent depth of object features than normal maps. Height maps may tessellate a base mesh or slightly change shape or geometry of a material (e.g., change the number of polygons or faces on an object), unlike normal maps. The generation of height maps or objects are described in more detail below.

The roughness generator 134 is generally responsible for generating a roughness object or map. A roughness map (also referred to as "glossiness" or "micro surface scattering") indicates at each point of a surface, how much the reflected light is scattered over the hemisphere. A roughness map typically indicates surface irregularities at microscale that causes reflected light diffusion. Rougher or non-glossy surfaces tend to have larger or dimmer looking highlights relative to smoother or glossy surfaces. Smoother surfaces tend to keep specular reflections focused, which can appear to look brighter or more intense even though the same total amount of light is reflected. In some embodiments, roughness maps start at a value of zero i.e., a perfect mirror, where a model will not scatter the reflected light at all, making the reflections and lighting much sharper and brighter on your material. Alternatively, if roughness is turned up to full, the light will be scattered around material more. This makes lighting and reflections spread further around the model, but also appear much dimmer. Generating a roughness map or object is described in more detail below.

The ambient occlusion generator 136 is generally responsible for generating an ambient occlusion map or object. An ambient occlusion map defines how much of the ambient environment lighting is accessible to a surface point. In some embodiments, the ambient occlusion map is multiplied or otherwise combined with the albedo map at render time to define how the corresponding object reacts to light. Therefore, the dark parts of the ambient occlusion map also darken the final combined albedo and ambient occlusion map while the white or lighter parts are left untouched. For example, crevices in a material can become darker with the addition of the ambient occlusion map, relative to the crevices with the albedo map. In some embodiments, an ambient occlusion map is a grayscale map with white being an area that will pick up the most light with darker areas being more in shadow and less reactive to light. The generation of the ambient occlusion map or object is described in more detail below.

It is understood that although the supplemental channel extractor 130 includes components that generate height objects, roughness objects, and ambient occlusion objects, additional or alternative objects or maps can be generated. For example, the supplemental channel extractor 130 can additionally or alternatively generate metalness maps (defines whether surface indicates metal or dielectric surface), opacity maps (defines how transparent material is, such as glass being very transparent), self-illumination maps, and the like.

The presentation component 124 is generally responsible for presenting content (or causing presentation of content) and related information to a user, such as a visual rendering. Presentation component 124 may comprise one or more applications or services on a user device, across multiple user devices, or in the cloud. For example, in one embodiment, presentation component 124 manages the presentation of content to a user across multiple user devices associated with that user. Based on content logic, device features, and/or other user data, presentation component 124 may determine on which user device(s) content is presented, as well as the context of the presentation, such as how (or in what format and how much content, which can be dependent on the user device or context) it is presented, when it is presented. In particular, in some embodiments, presentation component 124 applies content logic to device features, or sensed user data to determine aspects of content presentation.

In some embodiments, presentation component 124 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 124 can cause presentation of a visual rendering that reflects an input image, and a sliding UI element allowing the user to change any of the maps generated by the supplemental channel extractor 130. The presentation component 124 can additionally or alternatively cause presentation of other contextual data or metadata, such as timestamps of when an image was uploaded, source images, UI elements for users to manipulate visual renderings, and the like.

Consumer applications 126 generally refers to one or more computer applications or services, such as online/cloud applications or locally stored apps that consume, include, or utilize some or each of the components of the system 100. In particular, a consumer application 126 may receive or upload an input image and provide a visual rendering from the input image, as described within the system 100. In some embodiments, a consumer application 126 may utilize the presentation component 124 to cause presentation of visual renderings. Examples of consumer applications 126 may include, without limitation, computer applications or services for presenting media and/or editing media (e.g., Adobe Dimension®, Substance Painter®, Adobe® Photoshop®, Adobe After Effects®, and Adobe Premiere®), or other computer applications that include such functionality, such as social media service applications (e.g., PINTEREST, FACEBOOK, etc.), email, messaging, chat, or any other web application, plugin, extension, or locally stored application.

The storage 125 (e.g., a database, RAM, cache, persistent storage, etc.) can include different training data (e.g., labeled synthetic images) that have been used to train deep networks or other machine learning models, as described in more detail below. Additionally or alternatively, storage 125 can include the maps or objects generated by the delighting component 104, the baseline geometry channel extractor 116, the reconstruction component 120, and/or the supplemental channel extractor 130, different uploaded input images, different tiles extracted by the pixel extraction component 102, which are to be stitched together at reconstruction time, and the like.

Figure 2:
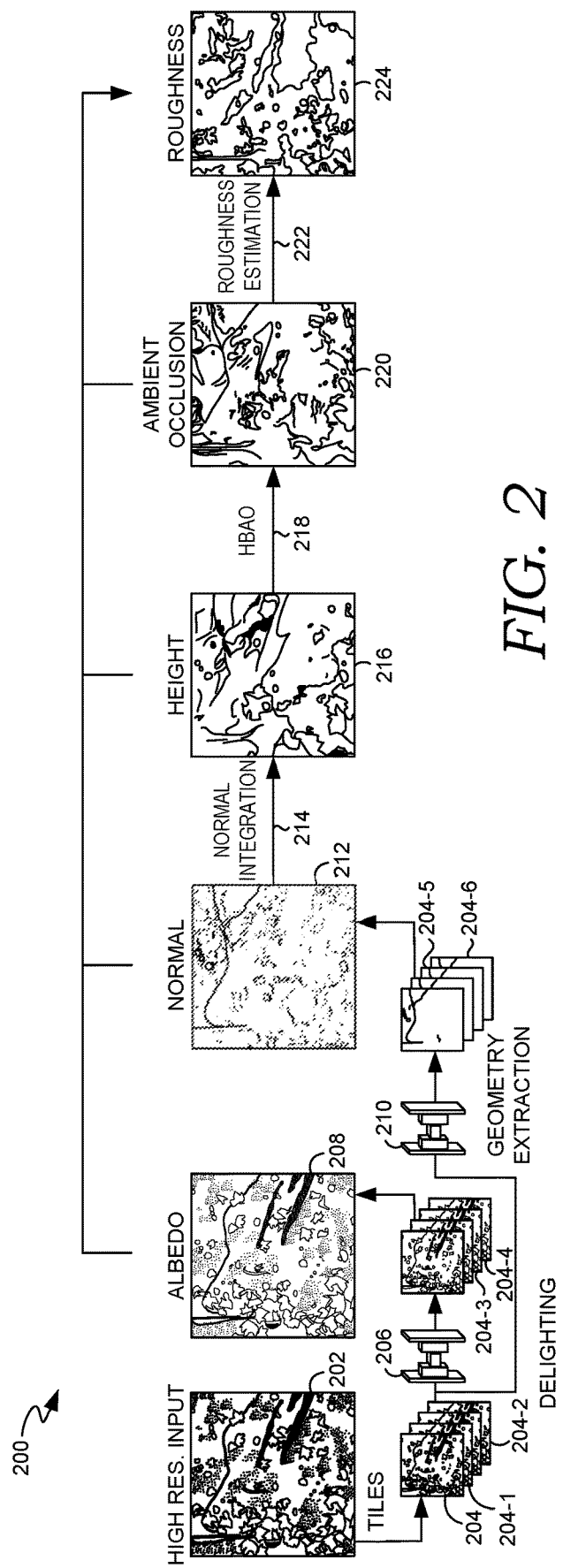
FIG. 2 is a schematic diagram illustrating a system for generating a high-resolution Physically-based Rendering (PBR) material using a deep learning and mathematical approach, according to some embodiments.

Turning now to FIG. 2, a schematic diagram illustrating a system 200 for generating various material maps to generate a high-resolution PBR material using a deep learning and mathematical approach, according to some embodiments. As described herein, certain real world heterogeneous materials, such as bricks, dirt, gravel, and the like have large geometric irregularities and self-casted shadows. Re-creating these irregularities in visual renderings are challenging. Various embodiments of the present disclosure solve this problem by utilizing 2 U-Net machine learning models 206 and 210 to partially generate a PBR material of a single input image 202.

The first stage includes inferring the albedo map 208 of a selected tile of the tiles 204 by a delighter U-Net 206, then inferring the normal map by a Geometry U-Net 210 for the selected tile, which uses the output of the delighter U-Net 206. In some embodiments, the inferring of the albedo map 208 using the delighter U-Net 206 is performed by the delighting component 104, as described with respect to FIG. 1. In some embodiments, the inferring of the normal map using the Geometry U-Net 210 is performed by the baseline geometry channel extractor 116, as described with respect to FIG. 1.

In some embodiments, a per-tile approach is used where 512×512 pixels (the dimension of the network) of the input mage 202 are extracted (e.g., by the pixel extraction component 102 of FIG. 1) and each individually processed (by the U-Nets 206 and 210) and the output is obtained by interpolating in the gradient domain. This keeps a small input size for (and hidden states sizes within) the neural networks, otherwise video memory would be over-consumed. In some embodiments, the height map 216, the roughness map 220, and the ambient occlusion map 220 are mathematically deduced, allowing to have a complete PBR material, which is described in more detail below. This is in contrast to the albedo map 208 and the normal map 212 which are derived from the Delighter U-Net and Geometry U-Net respectively, which is described in more detail below. In some embodiments, the albedo map generator 114 generates the albedo map 208, the normal map generator 118 generates the normal map 212, the height map generator 132 generates the height map 216, the ambient occlusion generator 136 generates the ambient occlusion map 220, and the roughness generator 134 generates the roughness map 224, as described in more detail below.

The system 200 of FIG. 2 further illustrates that each tile of the tiles 204 is processed through the U-Nets 206 and 210 and then seamlessly merged or stitched together to form the albedo map 208 and the normal map 212. For example, tile 204-1 is first processed through the Delighter U-Net 206 and becomes the tile 204-3. Subsequently, the tile 204-2 (another window of pixels of the input image 202) is also processed through the Delighter U-Net 206 and becomes the tile 204-4. Subsequently, the tiles 204-3 and 204-4 are merged or stitched together (e.g., via the stitching component 128) to arrive at the final albedo map 208, which indicates the full albedo of the entire input image 202. Responsively, the tile 204-3 gets processed through the Geometry U-Net 210 and becomes tile 204-5. And the tile 204-4 also gets processed through the Geometry U-Net 210 and becomes the tile 204-6. Responsively, the tiles 204-5 and 204-6 are merged or stitched together to become the normal map 212, which represents the normal map of the entire input image 202. Such merging is described in more detail below. As illustrated in the system 200, the height map 216, ambient occlusion map 220, and the roughness map 224 are all derived from the albedo map 208 and the normal map 212 representing all of the merged tiles (as opposed to each tile individually).

The system 200 of FIG. 2 further illustrates that the height map 216 is generated using normal integration 214 with the normal map 212, which is described in more detail below. Further, the ambient occlusion map 220 is generated using Horizon Based Ambient Occlusion (HBAO) merging 218, which is described in more detail below. Further, the roughness map 224 is generated using a combination of roughness estimation 222 derived from the ambient occlusion map 220 and the albedo map 208, as well as the normal map 212, which is described in more detail below.

Figure 3:
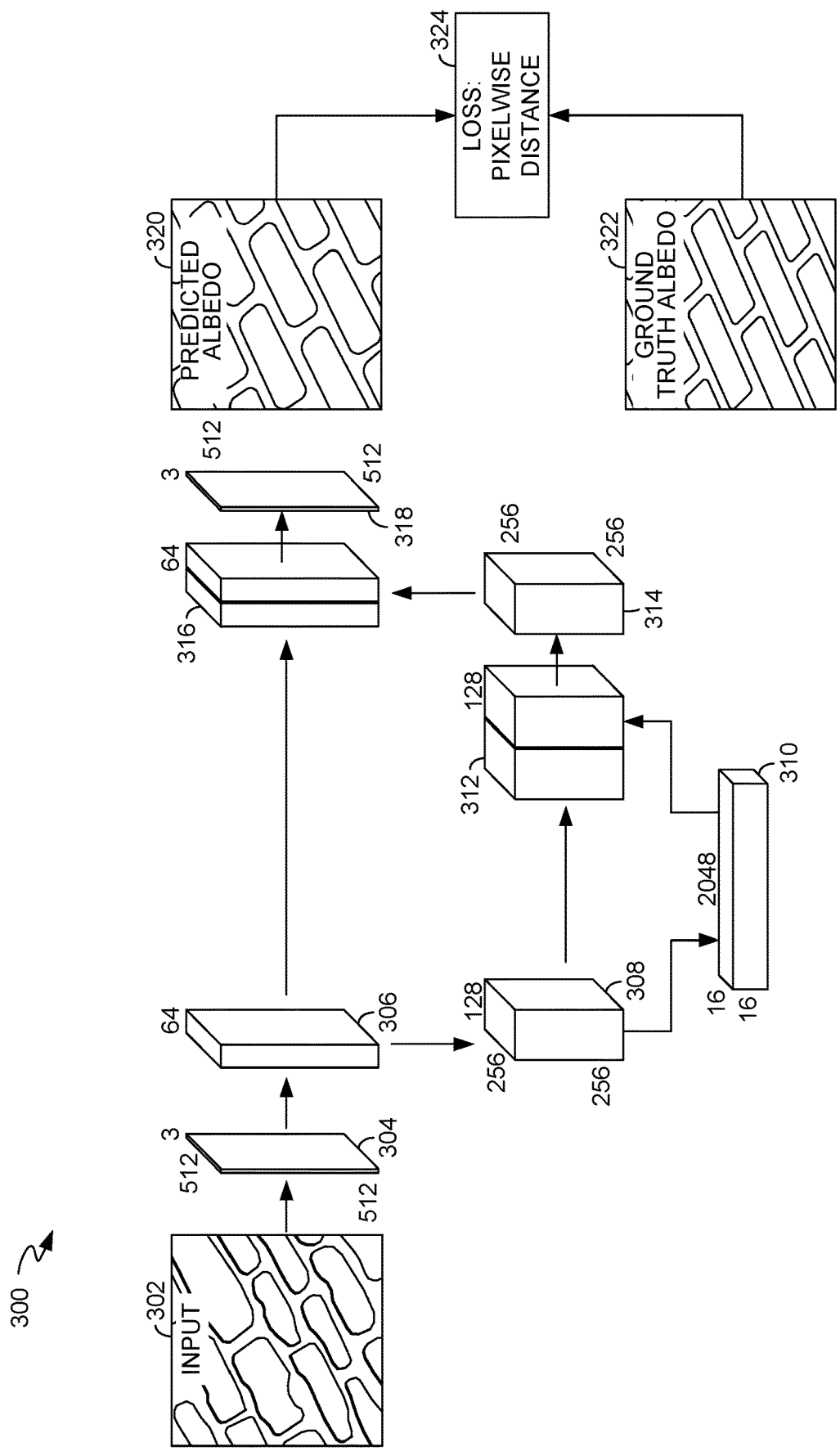
FIG. 3 is a schematic diagram of an example Delighter U-Net, according to some embodiments.

FIG. 3 is a schematic diagram of an example Delighter U-Net 300, according to some embodiments. In some embodiments, the U-Net 300 represents the Delighter U-Net 206 of FIG. 2. In some embodiments, the Delighter U-Net 300 represents the functionality performed by the delighting component 104 of FIG. 1. The input image 302 is first fed to the Delighter U-Net 300, which extracts the tile 304 and performs a convolution operation followed by a non-linear activation function ("ReLU") to contract the kernels into 64 channels and 5×5 (and/or 3×3) pixels (i.e., unit 306). The 5×5 and 3×3 pixel resolutions represent the sizes of the kernel of the convolution and not the spatial (image) resolution of the output tile. The output of the convolution has the same spatial resolution as the input (thanks to the padding operation). The convolution operation (or convolutional layer) generates one or more feature maps, which each represent a feature (e.g., a set of pixels) of the input image 302 (e.g., representing a tree). There may be various features of an image and thus there may be various linearly stacked feature maps for a given image. A feature map is also an array of values that represent sets of pixels and weights where a value is weighted higher when it matches a corresponding pixel or set of pixels in the corresponding section of the input image. The convolution layer includes an algorithm that uses each feature map to scan or analyze each portion of the input image 302. Accordingly, each pixel of each feature map is compared and matched up against a corresponding pixel in each section of the input image and weighted according to similarity. In some embodiments, the convolutional layer performs linear functions or operations to arrive at the feature map by multiplying each image pixel value with its own feature value and then performing a summation function of each product. In various embodiments, in response to the convolution operations and ReLU being computed, a batch normalization (BN) is performed, which re-centers and re-scales the resulting set of pixels.

In various embodiments, a max pooling function is then performed to arrive at 308, for which there are 128 channels and 256×256 pixels. Max pooling (i.e., the max pooling layer) reduces the resolution or compresses each feature map by picking a window size (i.e., a quantity of dimensional pixels that will be analyzed in the feature map) and selecting the maximum value of all of the values in this window of the feature map as the only output for the modified feature map. For example, the max pooling layer can compress the 512×512 pixels described above to 256×256 via a max pooling operation.

In various embodiments, additional convolutional, non-linear activation functions, and max pooling operations (also known as "down sampling" or "contraction" or "encoder" operations) can continue. For example, a 3×3 convolutional operation, ReLU, and BN operation, can be followed by another 3×3 convolutional operation, ReLU, and BN operation, followed by another max pooling operation at 2×2 to arrive at 310. Then up sampling (also known as "expansion" or "decoder" operations) can be performed. For example, n×n can be up sampled to 2 n×2 n (numeral 312), after which there is a 3×3 convolutional operation, ReLU, operation, and BN operation (which is repeated), to arrive at 314. Then additional up sampling can occur to arrive at 316, followed by 1×1 convolutional operation to arrive at 318, which is a 512×512 pixel representation that reflects the tile 304. FIG. 3 also illustrates skip connection functionality. "Skip connections" are a concatenation of features from the encoder (the horizontal central arrows in FIG. 3, from 306 to 316 and from 308 to 312).

The output of encoder and decoder functions is the predicted albedo 320 (e.g., the albedo map 208), which is typically used to produce an image-to-visual rendering. Using U-Nets are suitable for image-to-visual rendering tasks because embodiments translate the input image 302 to an albedo at the same resolution, without the shadows and highlights of the input image 302. In order to predict the albedo 320, the Delighting U-Net 300 uses the ground truth albedo 322. The loss function 324 is a pixel wise distance between the predicted albedo 320 and the ground truth albedo 322 (or more precisely, the feature vectors that represent the predicted albedo 320 and the ground truth albedo 322). The ground truth albedo 322 is generated at the data generation step before training, which is described in more detail below.

Figure 4:
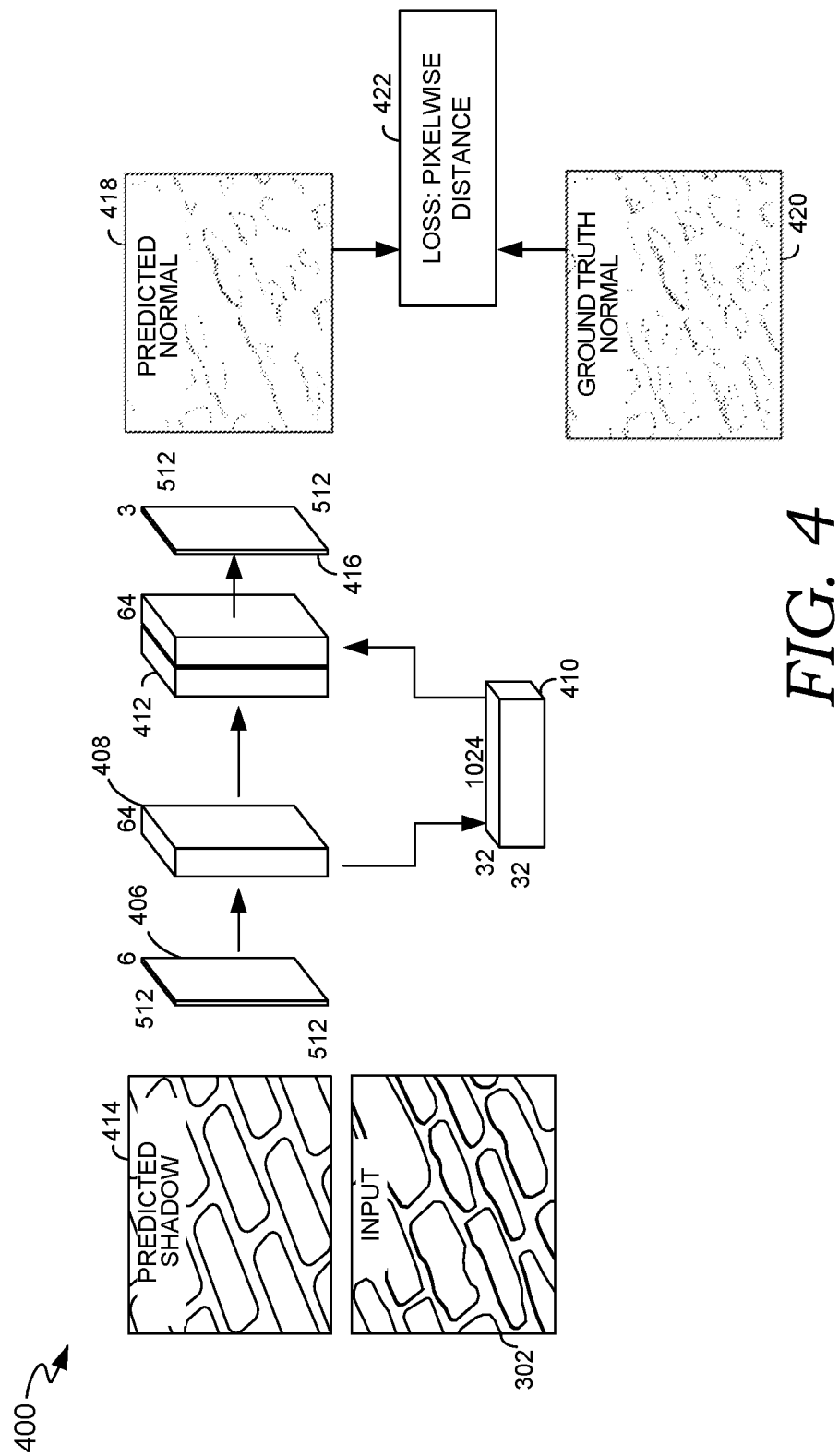
FIG. 4 is a schematic diagram of an example Geometry U-Net, according to some embodiments.

FIG. 4 is a schematic diagram of an example Geometry U-Net 400, according to some embodiments. In some embodiments, the Geometry U-Net 400 represents the Geometry U-Net 210 of FIG. 2. In some embodiments, the Geometry U-Net 400 represents the functionality performed by the baseline geometry channel extractor 116 of FIG. 1. The Geometry U-Net 400 takes, as input, the predicted shadow map 414 that represents or includes all of the shading characteristics of the input image 302, represented as a 512×512 object with 6 feature channels. This predicted shadow map 414 is concatenated with the input 302, thereby making 6 feature channels or dimensions for 406. In some embodiments, the predicted albedo 320 is derived from the shadow map 414. In some embodiments, the shadow map 414 represents the same shadow map 514 of FIG. 5. Subsequently a convolutional operation, ReLU operation, and BN operation is performed to arrive at 408, representing 64 feature channels. Responsively, a max pooling operation and an additional convolutional operation, ReLU operation, and BN, followed by another max pooling operation is performed to arrive at 410, indicating 32×32 pixels, with 1024 feature channels. Then up sampling and skip connection functionality can occur by doing a 2×2 convolutional operation to arrive at 412. Responsively, a 3×3 convolutional operation, ReLU operation, and BN is performed then repeated to arrive at 416, a 512×512 object with three feature channels. Subsequently, the Geometry U-Net predicts the normal 418 (e.g., the normal map generated by the normal map generator 118 of FIG. 1), which uses the ground truth normal 420 to make the prediction. The ground truth normal is used to train the network model, which then can make the prediction. Then the loss 422 is computed by calculating the distance (e.g., L1 norm, Euclidian, or Cosine) between the predicted normal 418 and the ground truth normal 420.

Various embodiments of the present disclosure use synthetic data sets for the ground truth albedo 322 of FIG. 3 and the ground truth normal 420 of FIG. 4. Although the objective in some embodiments is to reconstruct or generate a visual rendering from a single input image, various embodiments use additional visual renderings (the synthetic data) as input training data, as opposed to other images. Creating training pairs using real photographs as input and an accurate corresponding SVBRDF, for example, may be very difficult to achieve. Having an albedo free of any shade remaining in the occluded regions in the case of highly regular materials (e.g., in terms of lighting, shading, and geometry), would require a manual cleaning without the guarantee in the correctness. It would also take an extremely long amount of time to get enough variations in the data and in the lighting conditions to get a representative dataset. However, using synthetic data removes these obstacles because implementers can synthetically filter visual renderings across different shadings, shadows, and geometries, to cover several use cases of lighting and materials. This effectively allows machine learning models to train on visual renderings rich in texture, geometries, lighting, shadows, and the like. This leads to functionality, such as delighting (e.g., via the delighting component 104), working exceptionally well. Because the ground truth (e.g., 322 and 420) is mapped to several variations in lighting and geometry, there is a higher probability that the predicted albedo 320 and the predicted normal 418 will be more accurate, especially relative to other technologies.

In order to train, various embodiments of the present disclosure use the high quality procedural PBR material library Substance Source, which currently contains around 2000 Substance files. Each Substance file is a Directed Acyclic Graph (DAG) that procedurally outputs different channels (e.g., an albedo map, shadow map, highlight map, height map, roughness, metallic, etc.) of a physically based spatially varying material, with a set of exposed parameters allowing for the generation of variations and producing a huge amount of different materials. Various embodiments use outdoor categories of visual renderings training data (e.g., Ground, Stone, Terracotta, Plaster, Concrete-Asphalt) to fit with the most common cases of Substance Alchemist's users.

In various embodiments, the training data uses multiple material or visual rendering variations. Realistic visual renderings can be generated from a Substance file. Various embodiments sample the parameter's variations using a Gaussian distribution centered on the set of preset parameters defined in the Substance file, with a variance given by parameter_range/18.

In some instances, the Substance Source database lacks data with sharp edges, heterogeneous geometries, and/or varied textures that will cast strong and/or large shadows. Accordingly, in some embodiments, the Substance Source database is supplemented by splatting objects (e.g., stones, leaves, sticks) on the form of atlases (described with the channels of a PBR material, e.g., albedo, normal, height, roughness and opacity map), upon a ground material. That is, the ground materials from the Source database are augmented by splatting other objects in the form of material atlases, before generating the visual renderings. In some embodiments, splatting occurs in the space of material maps—splatting affects the basecolor, the normal map, and the like so that visual renderings can subsequently be computed.

In generating a visual rendering of material, various embodiments use a Substance Designer filter, which provides a material renderer, the "PBR Render" node. This filter uses the SVBRDF material information and an HDR environment map to produce a fast and realistic enough visual rendering that computes Image Based Lighting in addition to casting shadows from a downscaled version of the environment map and from the main or core light source in the environment map. Accordingly, particular embodiments generate a set of procedural minimalist HDR environment maps that simulate natural lighting conditions with a sun light at different daytime and a diffuse sky. Various embodiments modify the output of the PBR render node so that the node outputs the shadow map (e.g., made by the shadow map generator 106) and the highlight map (e.g., made by the highlight map generator 108) in addition to the resulting visual rendering. This will allow the illumination equation to be used and it will also help network decomposing how the captured colors have been affected by the light and material properties.

To perform training, various embodiments build a dataset of pairs of input (e.g., a visual rendering or material under a specific lighting condition) and targets. Targets include at least a set of ground truth maps (e.g., 322 and 420) that include an albedo map, a shadow map, a highlight map, and the homogenized normal map. Various embodiments augment or cause transformation to the training set. For example, from 350 substance files, there are 2100 materials that can be obtained, resulting in 30000 visual renderings and around 240000 training pairs of 512×512 pixels images.

Figure 5:
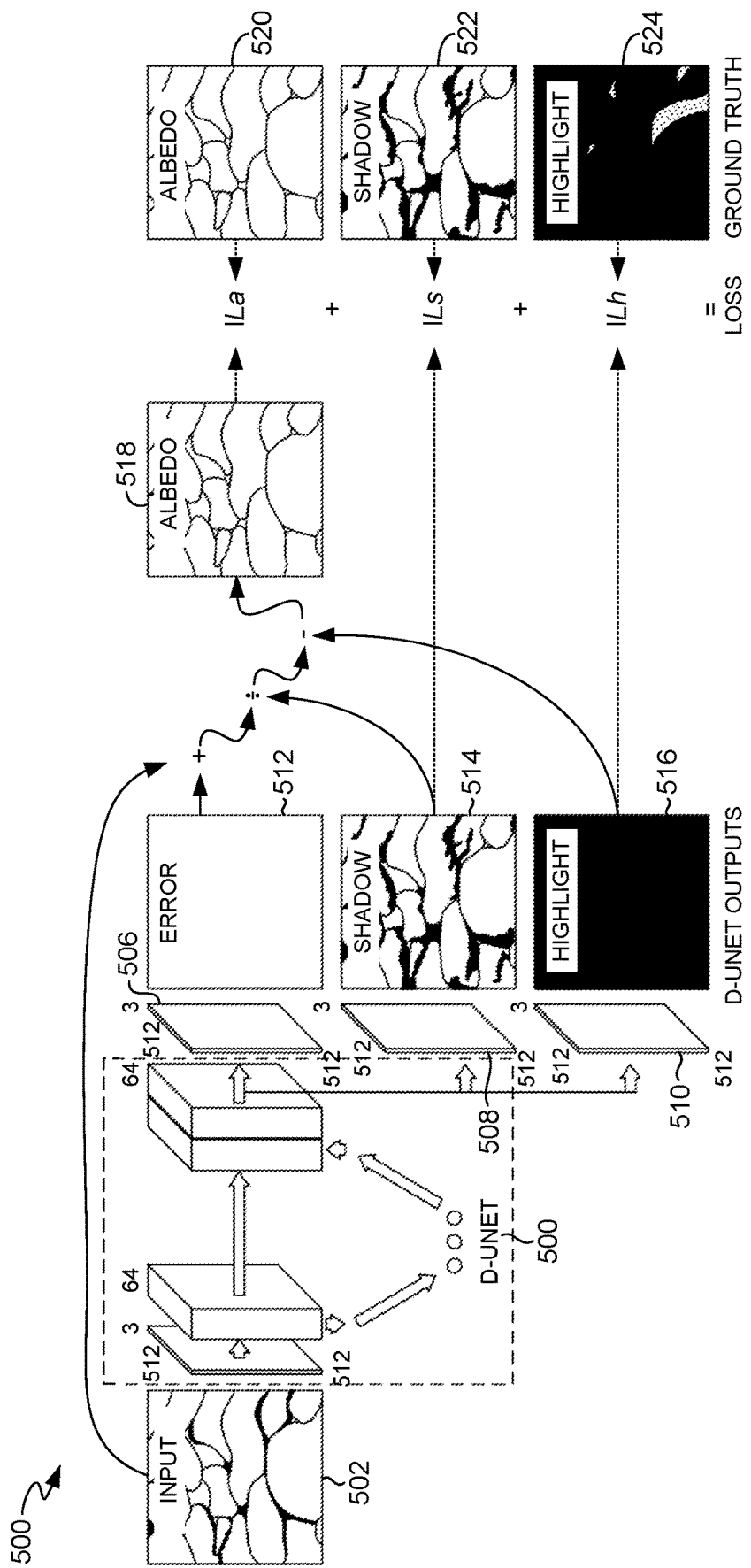
FIG. 5 is a schematic diagram of a Delighter U-Net, according to some embodiments.

FIG. 5 is a schematic diagram of a Delighter U-Net 500, according to some embodiments. In some embodiments, the Delighter U-Net 500 represents the Delighter U-Net 206 of FIG. 2, the delighter U-Net 300 of FIG. 3, and/or the functionality performed by the delighting component 104 of FIG. 1. The Delighter U-Net 500 takes as input a 512×512 naturally lit image 502 (e.g., a photograph taken on a mobile phone). In some embodiments, the Delighter U-Net has five levels of convolutional blocks on each side of the encoder and decoder portions or latent space. The Delighter U-Net predicts three outputs: the corresponding shadow map 514, the highlight map 516, and an additional error map 512, whose role is to recover from the input image 502 (or tile of the input image 502), the saturated area due to pixels that represent shadows or highlighted areas over threshold X. The resulting albedo map 518 is then computed using the reversed illumination equation, as follows:

$$albedo = \frac{input + error}{shadow} - highlight$$

Accordingly, the input (e.g., the set of pixels selected by the pixel extraction component 102) is summed with the error value, all of which is divided by the "shadow" value (e.g., the shadow map 514), which is subtracted from the "highlight" value (e.g., the highlight map 516). The resulting map is the albedo map 518.

FIG. 5 illustrates that the albedo map 518 is generated (or adjusted) based on model training functionality. Specifically, the albedo map 518 is generated based on the ground truth of the albedo map(s) 520, the shadow map(s) 522, and the highlight map(s) 524, where a loss is calculated, in distance (e.g., Euclidian distance) between the Delighter U-Net outputs 300 and the corresponding ground truth maps. Specifically, a loss is computed between the predicted and ground truth albedo maps (518 and 520), and all 3 losses (albedo, shadow, highlight) are summed to obtained the final loss.

Figure 6:
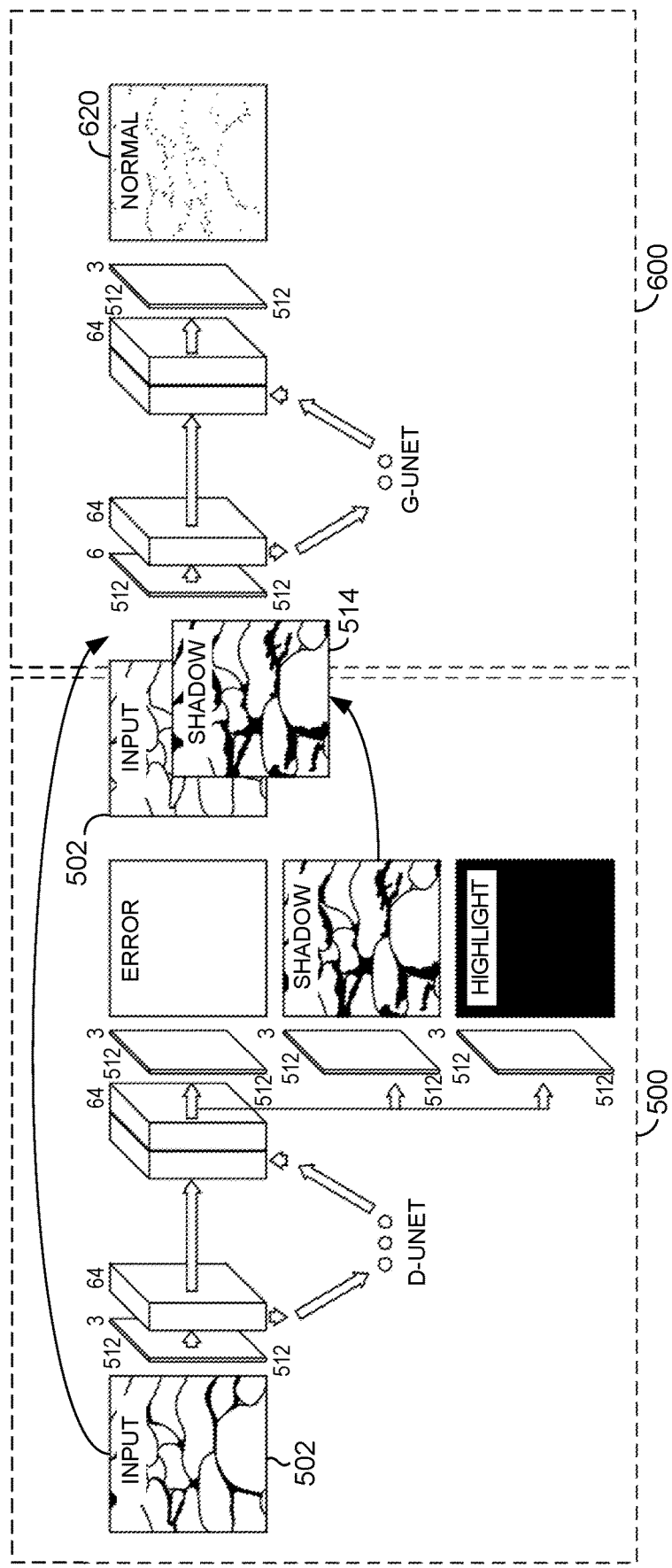
FIG. 6 is a schematic diagram illustrating how the Delighter U-Net of FIG. 5 and the Geometry U-Net of FIG. 6 are chained to make a prediction, according to some embodiments.

FIG. 6 is a schematic diagram illustrating how the Delighter U-Net 500 of FIG. 5 and the Geometry U-Net 600 of FIG. 6 are chained to make a prediction, according to some embodiments. In some embodiments, the Delighter U-Net 500 represents the functionality provided by the baseline geometry channel extractor 116 of FIG. 1, or the Geometry U-Net 400 of FIG. 4. FIG. 6 illustrates that the predicted shadow map 514 and the input 502 of FIG. 5 are fed, as input, into the Geometry U-Net 600, in order to derive the normal map 620.

Specifically, the input of the Geometry U-Net 600 is a concatenation between the predicted shadow map 514, and the input 502, leading to a six-dimensional input (as opposed to a 3-dimensional input at the Delighter U-Net 500), The U-Net 600 outputs the X and Y components of the normal map 620, Z being deduced. The Geometry U-Net 600 is shallower than the Delighter U-Net 500, with only four levels of convolutional blocks and less feature maps in the deepest layers. These chained U-Nets (or cascaded U-Net approach) allows embodiments to use the semantic values provide by the shadow map 514, as an indicator for the geometry recovery in the geometry map 620.

With respect to both the Delighter U-Net 500 and the Geometry U-Net 600, various embodiments use a combination of all of the output maps (e.g., albedo map 518, shadow map 514, highlight map 516, and normal map 620) for the loss computation, each one being based on the L1 norm between the prediction and ground truth. First embodiments train the Delighter U-Net 500 with the following loss function:

$$loss = \gamma_a loss_{albedo} + \gamma_x loss_{shadow} + \neq_h loss_{highlight}$$

where $\gamma_a$ is set to 1, $\lambda_s$, and Ah are set to 0, 7 in various embodiments. Subsequent to the training converging, the weights are fixed of the delighter U-Net 500 and the geometry U-Net 600 is trained in order to derive the normal map 620. To enforce the geometry U-Net 600 to infer a normal map 620 with sharp or high resolution edges, various embodiments compute a weight map inversely proportional to the ground truth normal Z value, giving more importance to the non-pointing up normal values, which is multiplied to the L1 loss. Various embodiments use a Bounded ReLU as the activation functions with a threshold (e.g., of 6) to help the network converge by preventing the accumulation of a perturbation in the input signal across layers. Various embodiments use up-sampling with the nearest neighbors (of maps) in the decoding portion of the U-Nets, and mirror padding at all stages to reduce the artifacts at the boundaries of each 512×512 tile.

Figure 7:
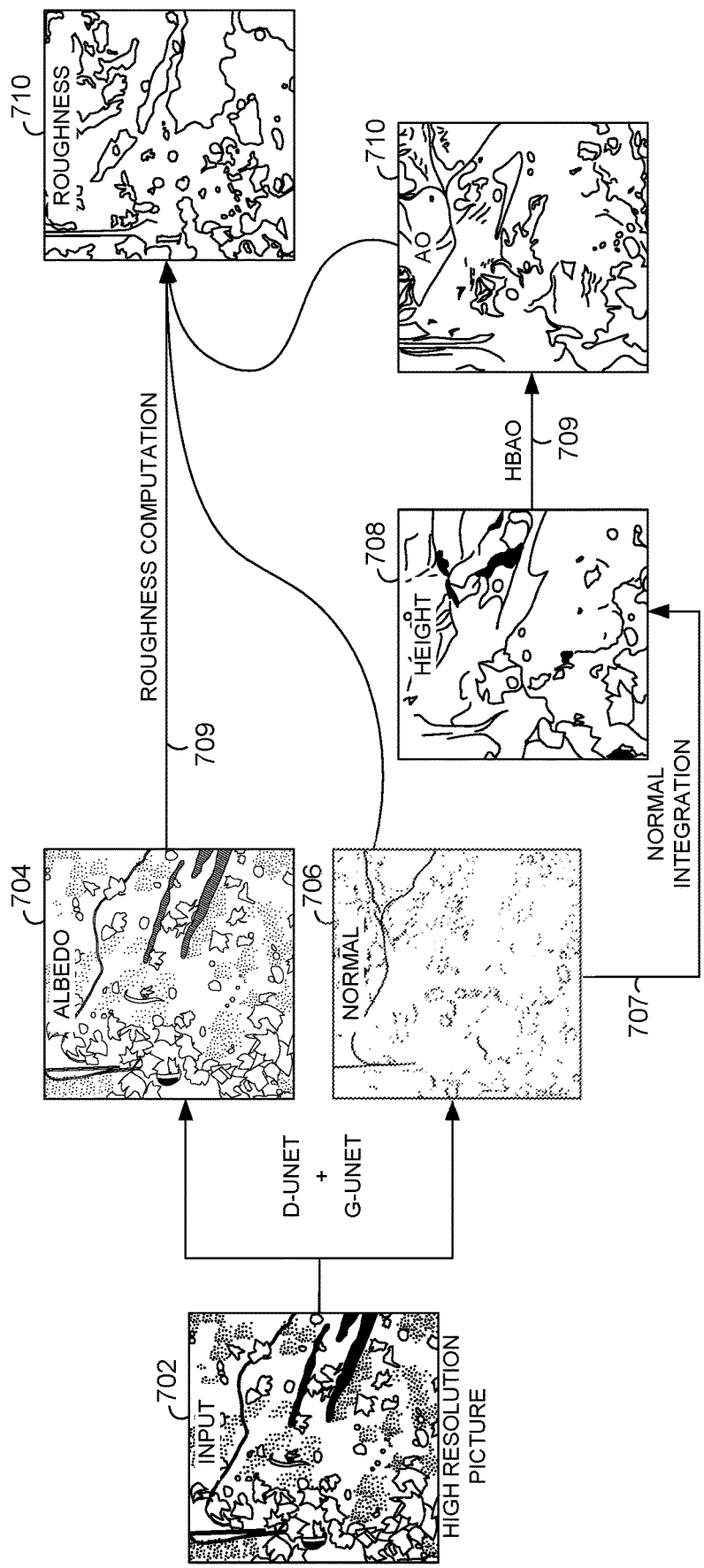
FIG. 7 is a schematic diagram illustrating how the output map of a Delighter U-Net and Geometry U-Net are used together to derive a height map, an ambient occlusion map, and roughness map, according to some embodiments.

FIG. 7 is a schematic diagram illustrating how multiple image maps are generated and used together to derive a roughness map, according to some embodiments. The input image 702 (or pixel tile of the input image 702) is fed into the Delighter U-Net to derive the albedo map 704 (e.g., the albedo map 518 of FIG. 5). The input image 702 (or pixel tile) is additionally fed into the Geometry U-Net to derive the normal map 706 (e.g., the normal map 620 of FIG. 6).

Normal integration 707 is performed to integrate the normal map 206 to the height map 708. That is, the height map 708 is computed from the normal map 706 so each change to the normal map 706 effects the height map 708. To mitigate the geometric information balance inconsistency between the height map708 and the normal map 706 across the entire training data set (e.g., the entire Substance material database), various embodiments compute a reliable version of the normal map 206 by blending the normal stemming from the height map 708 and the normal map 206 prior to generating the visual rendering, and keep it as the ground truth normal map (e.g., 322).

HBAO merging 709 is performed to merge the resulting height map 708 with the Ambient Occlusion map 710. The output of the AO map 712, the normal map 706, and the albedo map 704 is concatenated or otherwise used, as the roughness computation 714, to derive the roughness map 712.

As illustrated in FIG. 7, the height map 708 is computed starting from the normal map 706 via normal integration 707. In some embodiments, normal integration 707 occurs via the Durou algorithm. Contrary to orthographic integration, perspective integration does not allow a direct computation of the object surface, since the graph z=Z(x, y) of the computed height Z is not the scene surface. But, knowing that an image point Q=(x, y) is conjugated with the object point P=(xZ(x, y)/f, y Z(x, y)/f,Z(x, y)), it is easy to compute the scene surface from Z. This method implies solving a Poisson system using the normal divergence field as the guidance field.

In some embodiments, the Ambient Occlusion map 710 is computed using the Substance Designer filter HBAO 709 (Image-Space Horizon-Based Ambient occlusion). The displacement factor to consider for this computation is exposed in order to be used. As illustrated in FIG. 7, the roughness map 712 is calculated (714) using the albedo map 704, the normal map 706, the ambient occlusion map 710, using the following formula:

Roughness—max_(1-normalZ)+(1-ambient occlusion), 1-luminance)

In some embodiments, the roughness global brightness is finally adjusted by moving the mid-grey value of the roughness map histogram value that is exposed to the user. In some embodiments, the user has some control over the ambient occlusion factor (displacement), the mid-roughness value, and the balance between the low and high frequencies of the normal ($\alpha$).

Figure 8A:
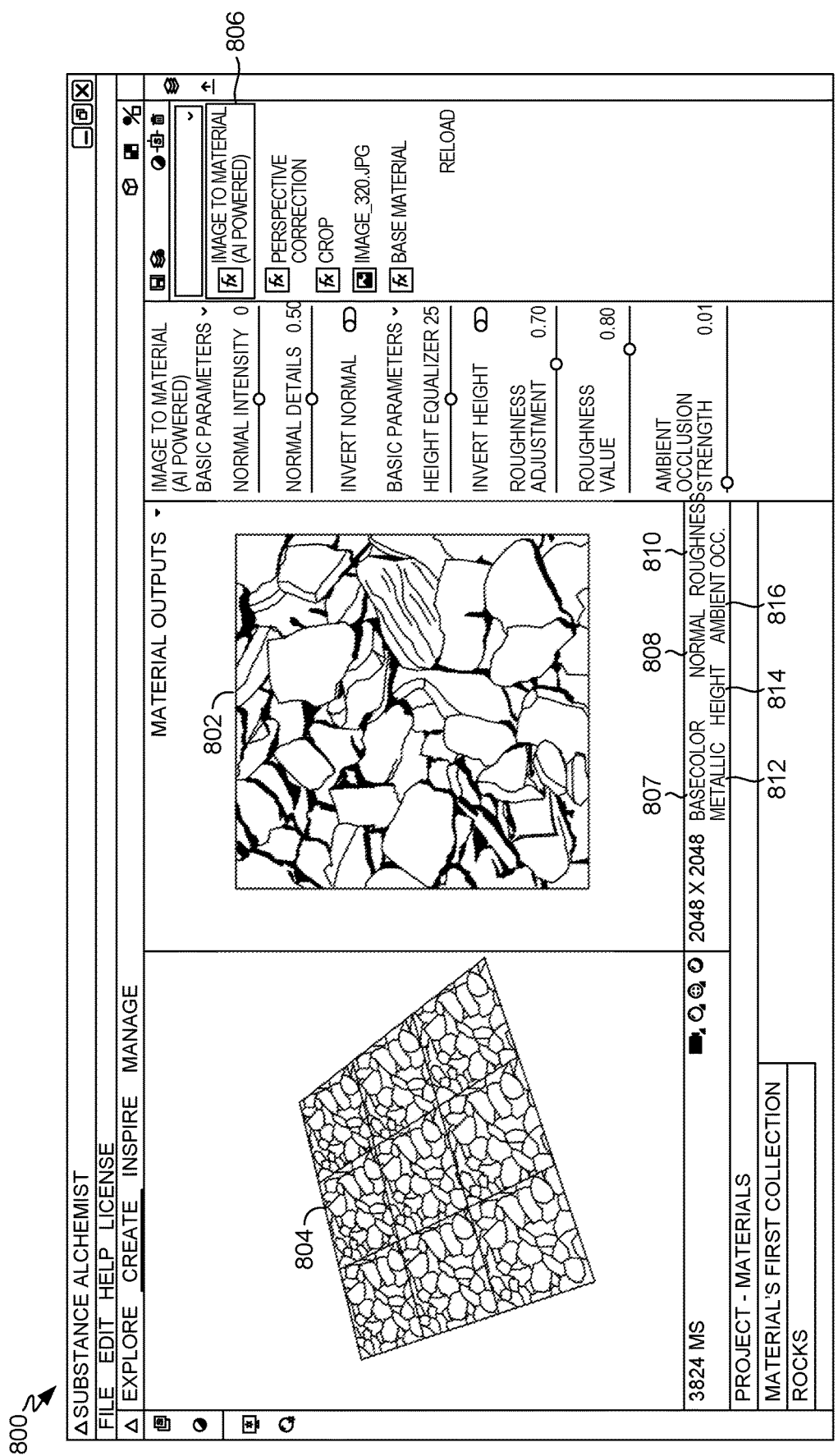
FIG. 8A a screenshot of an example user interface that illustrates image-to-material translation, according to some embodiments.

FIG. 8A is a screenshot 800 of an example user interface that illustrates image-to-material translation, according to some embodiments. In some embodiments, the screenshot 800 represents what is output by the presentation component 124 of FIG. 1. In some embodiments, the screenshot 800 is a part of the consumer application 126 as described with respect to FIG. 1.

Various embodiments first receive an input image 802, which is a 2-dimensional photograph of a set of rock objects/materials, with complex shading and texture characteristics. Some embodiments, for example, can store, in computer memory, the input image 802 in response to an upload operation by a user via a consumer application 126. In response to receiving an indication that the user has selected the UI element (e.g., button, menu, dial, etc.) 808, various embodiments generate the visual rendering 804, which indicates or represents the input image 802, except that it is a full three-dimensional rendering. In this way, for example, various embodiments can rotate (e.g., via user input of a pointer), in any suitable plane or orientation, the visual rendering 804 so that rock objects can be viewed by the user from a variety of different angles. In various embodiments, the visual rendering 804 initially represents a combination of channel maps (e.g., a concatenation of the albedo map 704, normal map 706, the height map 708, the AO map 710, and/or the roughness map 712). In various embodiments, in order to translate or reconstruct the input image 802 to the visual rendering 804, the pixel extraction component 102, the delighting component 104, the baseline geometry channel extractor 116, the supplemental channel extractor 130, and/or the reconstruction component 120 as described with respect to FIG. 1 performs its functionality.

In some embodiments, in response to receiving an indication that the user has selected the "base" UI element 807, the input image 802 changes to the albedo map (e.g., the albedo map 704 of FIG. 7), such that the user can visually view the predicted albedo map of the input image 802. Likewise, in response to receiving an indication that the user has selected the "normal" UI element 808, the input image 802 changes to the normal map (e.g., the normal map 706 of FIG. 7). Likewise, in response to receiving an indication that the user has selected the "roughness" UI element 810, the input image 802 changes to the roughness map (e.g., the roughness map 712 of FIG. 7). This same process is repeated for the height UI element 814 (e.g., to derive the height map 708), the ambient occlusion UI element (e.g., to derive the AO map 710) 816, and the metallic UI element 812.

Figure 8B:
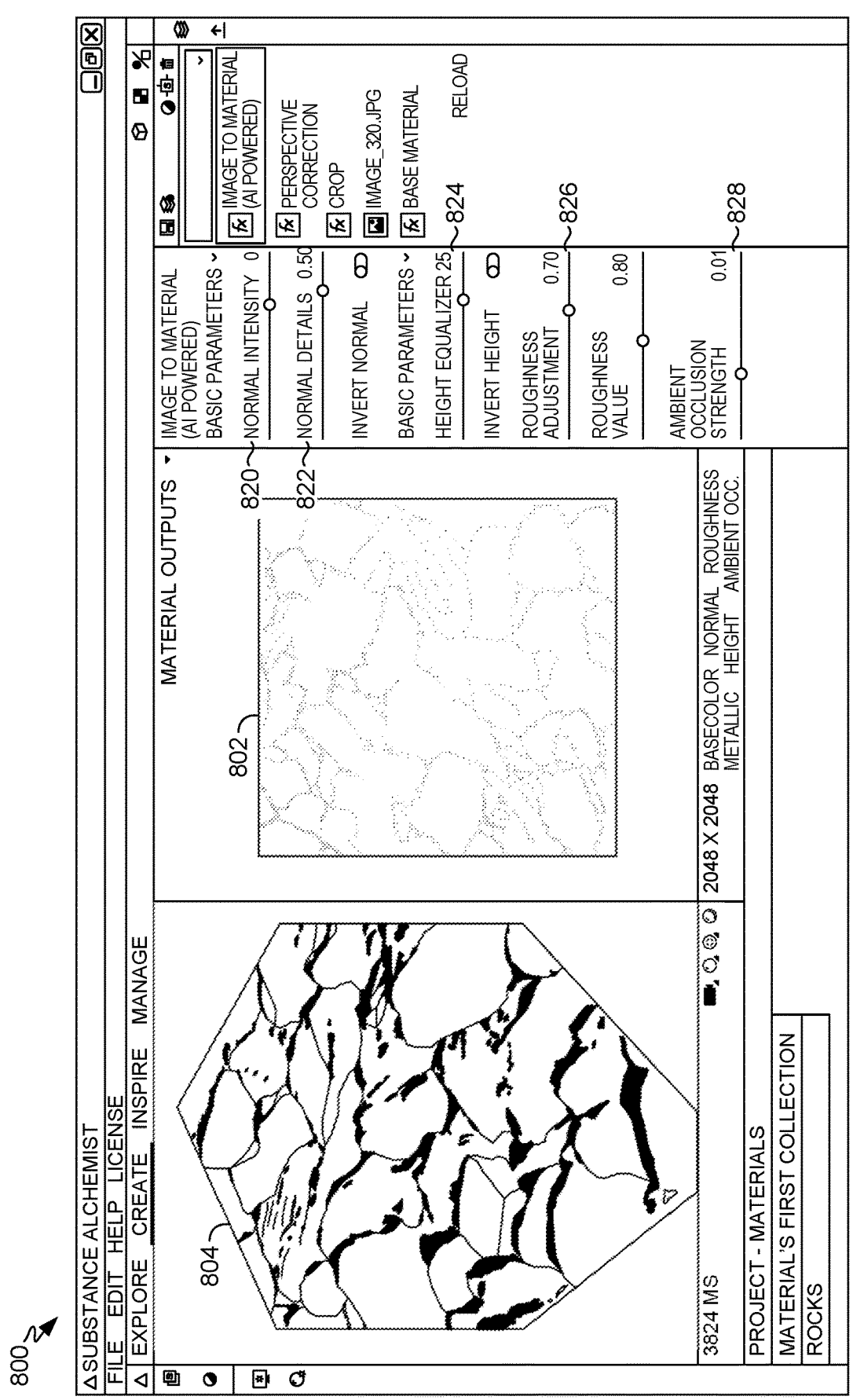
FIG. 8B illustrates the screenshot of FIG. 8A showing that parameters can be user-adjusted, according to some embodiments.

FIG. 8B illustrates the screenshot 800 of FIG. 8A showing that parameters can be user-adjusted, according to some embodiments. In response to receiving an indication that the user has adjusted the slider UI element 820 position (e.g., from left to right), various embodiments alter the normal map intensity to the visual rendering 804. For example, in response to receiving an indication that the user has selected to provide a higher intensity to the normal map, various pixel values surrounding the rock objects are filtered or changed to a darker color to indicate more shading or pixel values may change on the rock objects themselves to include more texture characteristics. For example, the visual rendering 804 appears to have more texture and shading relative to the visual rendering 804 in FIG. 8A.

The slider UI element 822 is configured to cause a change between a low resolution normal map and a high resolution normal map (e.g., which is generated via the multi-scale resolution component 122). In various embodiments, as described herein, the low resolution normal and the high resolution normal are blended together before the height map is computed. The low resolution normal represents the geometry low frequencies, whereas the high resolution normal represents the geometry high frequencies. Similar to the slider UI element 822, there are other slider UI elements 824, 826, and 828 to adjust, at the visual rendering 804, the height intensity, the roughness intensity 826, and the ambient occlusion intensity respectively. For example, in response to receiving an indication that the user has requested a change in the roughness intensity, the pixel filtering values may change to indicate that the corresponding rock objects or materials are shinier (or duller).

Figure 9:
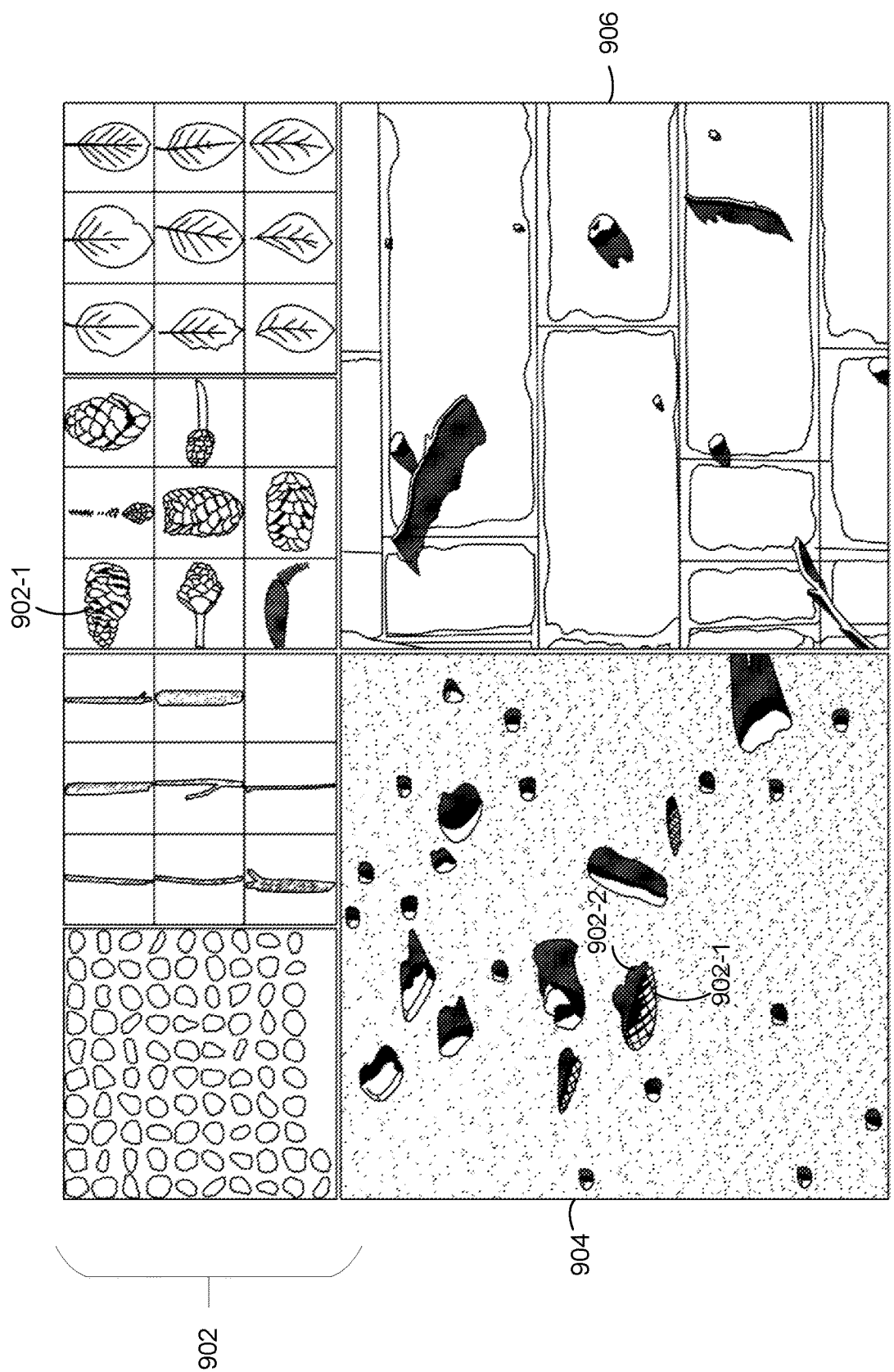
FIG. 9 is a schematic diagram illustrating PBR material augmentation using the splatting of PBR atlases, before producing the visual renderings in preparation for training, according to some embodiments.

FIG. 9 is a schematic diagram illustrating atlas splatting on visual renderings in preparation for training, according to some embodiments. 902 represents various albedo maps of various atlases (e.g., 902-1), such as stones, sticks, pine cones, and leaves. As described herein, various embodiments train on synthetic data, such as PBR materials from a Substance Source Database (as opposed to 2d input images). This allows for the capturing of more varied lighting and shading characteristics, as different lighting angles and shading can synthetically be defined.

In some embodiments, the atlas splatting is done at the PBR material level for the Ground material category (e.g. not all the material from Substance Source database are eligible to be augmented using atlas splatting, as it is more realistic to add small objects upon a ground than upon a brick wall. Some embodiments augment the database of Ground PBR materials using atlases from Substance Source. An atlas is also described or represented as all the channels of a PBR material (albedo, normal, height, roughness maps . . . ).

Various embodiments perform the augmentation steps in the following manner. First, a ground material is chosen (e.g., grass, dirt, etc.). Then, a set of atlas materials (e.g., 3) (e.g., stones, sticks, leaves, cones, debris).are chosen among the atlases compatible with the ground material. Subsequently, the atlases are splattered upon the ground material, using a Substance graph that allows randomly distributing the objects in the 3 atlases upon the base material, and computing a new PBR material. For each initial ground material embodiments produce 3 variations with different atlases. Then, at the rendering step, the PBR materials coming directly from Substance Source and the ones coming from the atlas splatting step are processed the same way, to generate variation on the lighting condition.

In some embodiments, FIG. 9 illustrates PBR material augmentation using the splatting of PBR atlases, before producing the visual renderings. To generate a visual rendering to train on, the atlases are splatted to the ground materials, as represented in 904 and 906. For example, atlas 902-1 from the albedo maps 902 can be splatted onto the ground material 904, which also thereby causes shadowing features 902-2 to be present as well. As illustrated in FIG. 9, there are variously shaped atlases splatted in various orientations, thereby causing varied lighting and shadow characteristics. This increases the variability and representativeness of materials containing objects that cast large shadows.

As described herein, in various embodiments realistic materials are used starting from a Substance file. Theoretically, procedurally modifying the parameters in the substance file in their allowed ranges could produce highly unrealistic materials and a manual cleaning pass would be necessary, which is time-consuming and discourages from iterating on the dataset. Consequently, various embodiments adopt a variation strategy by sampling parameter variations using a Gaussian distribution centered on the set of present parameters defined in the substance file, with a variance given by parameter range/18.

Further, the Substance Source database lacks data with sharp edges that will cast strong and large shadows. Accordingly, various embodiments complement the Substance Source database by splatting on ground materials small objects, such as stones, leaves, sticks on the form of atlases, as illustrated in FIG. 9. This causes varied data with sharp edges and varied shadows to be present.

Various embodiments use 7 different environment maps, and produce visual renderings on environment rotation for training. In some embodiments, the sun and sky colors are varying during the render phase to increase the robustness against the color shifting of the illuminated and shadowed parts.

In some embodiments, material maps and visual renderings for training are generated in 2048×2048 pixels, with an aim to work with 512×512 pixels input images for the network. Data augmentation can include rotating, flipping, scaling, and finally cropping input images to this resolution.

Experimental Results

As described herein, various embodiments improve existing technologies in terms of accuracy, among other things. The inventors have conducted experiments with regard to accuracy and visual rendering quality, as described in more detail below.

Various embodiments of the present disclosure successfully remove the shadows (e.g., via the shadow map generator 108) and the specular highlights (e.g., via the highlight map generator 112) present in the input image. Various embodiments generate a visual rendering result that is qualitatively close to the ground truth albedo, with details and contrast preserved. For example, with respect to an input rendered material of 512×512 pixels, the predicted albedo, the ground truth albedo, the predicted normal, and the ground truth normal appeared very similar qualitatively. At least partially because of the training dataset that is augmented with splatted atlases, the strong and large shadows of the input image are well removed. The material geometry is well recovered in the normal map, which presents with sharp edges, and allows, after deducing all the PBR channels, for a final render of the virtual material extracted that is very close to the input image.

Various experiments also qualitatively generalized well on real pictures or photographs, and allowed a capturing a full fledge high-resolution PBR material that is synthetically relit without a shadows artifact (e.g., filtering pixel values indicative of removing shadows to arrive at an albedo map generated by the albedo map generator 114), with good preservation of the geometry.

The experiments evaluated the quality of the network prediction using three metrics: Mean Squared Error (MSE), Mean Absolute Error (MAE), and Structural Similarity (SSIM) error, comparing the predictions to the ground truth (see Table 1 below). In addition, a test set has been created and dedicated to checking the visual quality of the network output on carefully selected real cases. For this purpose, embodiments have aggregated pictures of grounds and stones taken in the context of photometry and photogrammetry, using several camera devices and under various lighting conditions. As illustrated in table 1, the predictions were fairly accurate.

TABLE 1

| Metric | Input/albedo | Albedo Pred/GT | Normal Pred/GT |
|---|---|---|---|
| MAE | 0.07671 | 0.0507 | 0.0406 |
| MSE | 0.0150 | 0.00631 | 0.0049 |
| SSM | 0.3834 | 0.240 | 0.263 |

For these experiments, various embodiments used TensorFlow framework in Python to train the model(s). In these experiments, the network required around 20 Go of memory during the training stage. Various embodiments used a NVivia Quadro GV100 for the training, which takes around 5 days to get a fully converged model.

To overcome this issue, a C++ API was implemented for the network directly using CUDA and CuDNN libraries. The weights of the network were exported as a binary file from Tensorflow, which was read by the C++ API when the network was rebuilt, and some optimized CUDA kernels for the operations that are not natively available in CuDNN was developed (for instance, the reflect padding and the nearest neighbor up-sampling). A benchmark was performed on the performance to compare the CuDNN implementation with the use of TensorFLow GPU C++, and also the use of a single or half precision in CUDA, as well as the use of the optimized TensorCore operations for the convolution with the CuDNN (see table 2).

TABLE 2

| Method | Duration (ms) |
|---|---|
| TensorFlow $1^{st}$ inference | 307.7 |
| TensorFlow next inference | 44.3 |
| CuDNN FP32 | 53.1 |
| CuDNN FP16 | 37.0 |
| CuDNN TensorCore optimum | 21.1 |

As illustrated, Table 2 illustrates the inference performance benchmark on albedo retrieval. The measure was done on an NVidia Quadro GV 100 for a batch of 16 images in 512×512, expressed in MS per image.

Table 3 illustrates the specific performances of various embodiments of the present disclosure. The Poisson equation solving is done using the Intel®MKL Poisson Library, using the color gradients as vector field for the albedo and the spherical coordinates gradients for the normal map. In certain embodiments and for the experiments, the following process is performed for both the albedo map and normal maps. The gradients in the horizontal axis and the vertical axis are computed per tile and per channel in a dedicated CUDA kernel, then stitched together as for the predicted tiles. Various embodiments use the Dirichlet boundary condition and fix the boundary values to the actual values of the entire stitched image boundaries. Various embodiments set a 0 value of gradient at the boundary of a tile in the considered direction (e.g., by having a null gradient for all pixels of the right border in the horizontal gradient, and respectively for the bottom border and vertical gradient). Finally acquiring the full PBR material from a 2048×2048 picture may take around 4 seconds, with this repartition:

TABLE 3

| Step | Duration (ms) |
|---|---|
| Inference high-resolution (16 512 × 512 tiles) | 0.75 |
| Inference low-resolution (one 512 × 512 tiles) | 0.7 |
| Poisson solving albedo and normal | 1.0 |
| Normal blending | 0.2 |
| Height computation | 1.0 |
| AO and Roughness computation | 0.5 |

As described herein, various embodiments of the present disclosure acquire or generate a visual rendering (e.g., a high-resolution PBR material) from a single image using a hybrid approach and combination of deep learning (e.g., via 2 chained U-Nets) and mathematical approaches.

Various embodiments successfully remove the shadows of the input image (e.g., via the shadow map generator 106), which comes from the lighting, all the while preserving the contrast for a high quality albedo map. Expressing the base color result (or albedo map) using the illumination equation and using the ground truth shadow and the highlight map helps a computer understand the semantics of the input image. Exploiting of the semantics is performed by using the shadow map in addition to the input image to infer the normal map. The multi-scale post-process for the normal allows for well-preserved low and high frequencies in the resulting normal map, which leads to a satisfying height map where the material geometry is well-captured. The costless computing of the roughness, shows good results for adding the small details in the light reflection while rendering the resulting material.

Various embodiments develop an adequate framework for the procedural data generation starting from substance files, and produce a large and realistic dataset of synthetized rendered materials. Particular embodiments solve the lack of highly irregular materials in the Substance Source database by exploiting the power of atlas splatting. Various embodiments employ the trained model in an optimal way using NVidia CuDNN library.

Exemplary Flow Diagrams

Figure 10:
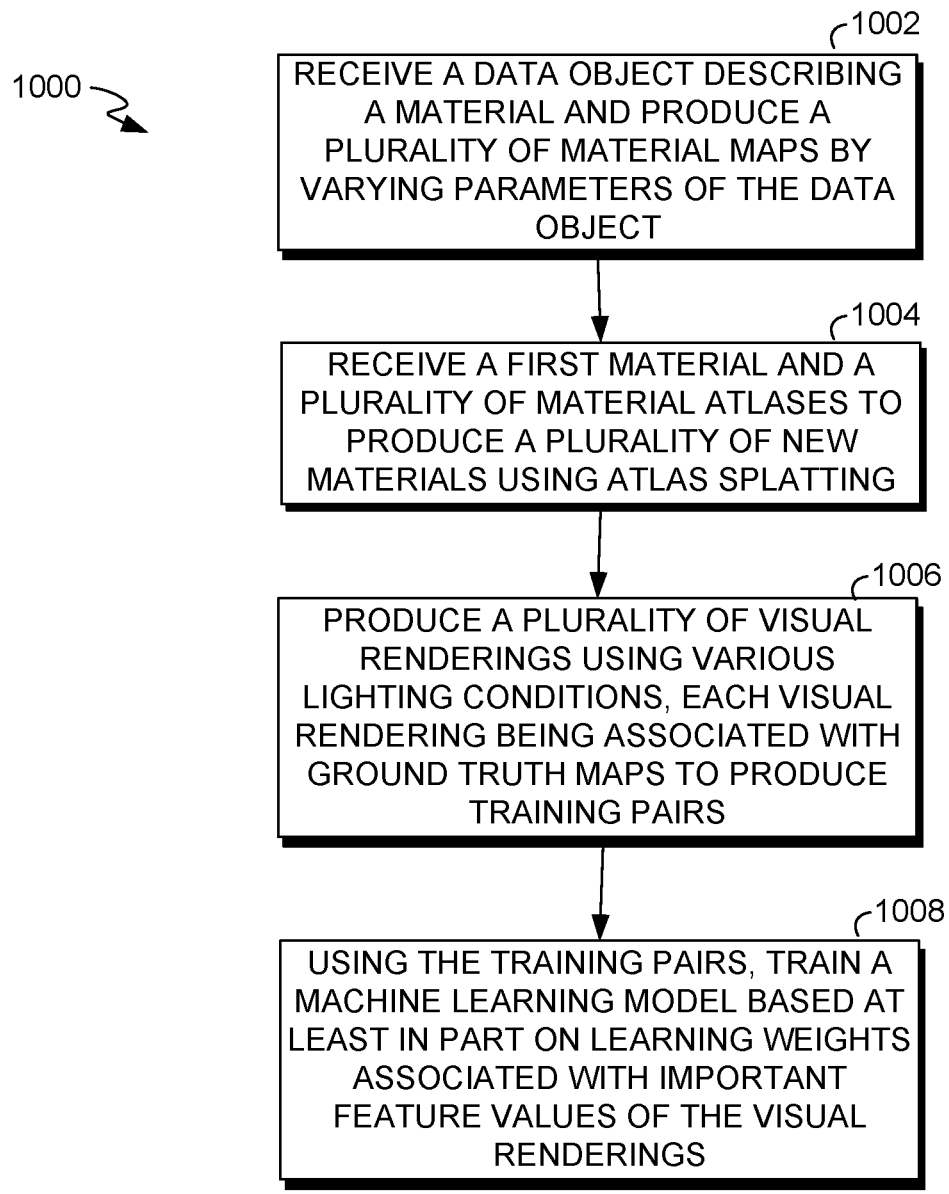
FIG. 10 is a flow diagram of an example process for training a machine learning model, according to some embodiments.

FIG. 10 is a flow diagram of an example process 1000 for training a machine learning model, according to some embodiments. The process 700 (and/or any of the functionality described herein (e.g., process 1100)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1000, 1100, and/or any other functionality described herein. In some embodiments, the process 1000 represents the functionality described with respect to the predicted albedo/normal 320/418, the ground truth albedo/normal 322/420, and the loss pixel wise distance 324 and 422 of FIG. 3 and FIG. 4 respectively.

Per block 1002, a data object describing a material is received and a plurality of material maps are produced by varying parameters of the data object. For example, as described herein, a Substance Source Graph (a DAG) indicates a particular material as a first node that is connected, via edges, to the material maps (e.g., albedo, normal, height, etc.) of various parameters.

Per block 1004, a first material and a plurality of material atlases are received to produce a plurality of new materials using atlas splatting. Examples of this are described with respect to FIG. 9, where the material atlases 902 are splatted against the materials to produce the new ground materials 904 and 906. Per block 1006, a plurality of visual renderings are produced using various lighting conditions, where each visual rendering is associated with ground truth maps to produce training pairs. Examples of block 1006 are partially indicated in FIG. 9. For example, the materials 904 and 906 can also represent visual renderings when there are various lighting and shading effects, as illustrated, for example, with respect to the shading from the material atlas 902-1 to 902-2. Each visual rendering can comprise or be associated with (e.g., via the DAG) ground truth maps in order to select training pairs of maps to train on (e.g., an albedo map and normal map of the same visual rendering).

Per block 1006, using the training pairs, a machine learning model (e.g., a U-Net) is trained based at least in part on learning weights associated with important feature values between the input and target material maps or renderings. For example, using the illustration above, a particular rock wall visual rendering may be associated with a particular pattern in the rock objects defined by a weight. These weights can be learned for each ground truth visual rendering or map such that features can be learned, which are the most important for the visual renderings/maps classified/predicted.

In some embodiments, pairs of similar visual maps and/or dissimilar visual maps are processed or run through a deep learning model by comparing the set of features associated with the visual renderings by mapping vectors representing the features in feature space and computing a distance (e.g., Euclidian or Cosine) between the vectors. And based at least in part on the distance, weights associated with the deep learning model can be adjusted to indicate the importance of certain features of the set of material maps/visual renderings for prediction or classification. In some embodiments, the adjusting includes changing an embedding of the visual renderings in feature space. For example, after a first round or set of rounds of training, it may be unknown what features of the material maps/visual renderings are important for taking on a certain classification or prediction. Accordingly, each feature may take on equal weight (or close to equal weight within a threshold, such as a 2% changed weight) such that all indications of the vectors are substantially close or within a distance threshold in feature space. However, after several rounds of training or any threshold quantity of training, the indications may adjust or change distances from each other based on the feature similarity. The more features of two material maps/visual renderings that match or are within a threshold value, the closer the visual renderings are to each other, whereas when features do not match or are not within a threshold value, the further away the two material maps/visual renderings are from each other.

In various embodiments, the training includes adjusting weights associated with the deep learning model to indicate the importance of certain features of the material maps/visual renderings for prediction or classification. In some embodiments, the training includes learning an embedding of a first material map/visual rendering of the similar material maps/visual renderings in feature space. Learning an embedding may include learning the distance between two or more feature vectors representing material maps/visual renderings based on feature similarity of values and adjusting weights of the deep learning model. For example, as described above, the more that features (e.g., similarly shaped rocks) of material maps are matching or are within a threshold feature vector value, the closer the two visual renderings are to each other in feature space, whereas when features do not match or are not within a feature vector value threshold, the further away the two material maps are from each other in feature space.

Accordingly, in response to various training stages, the strength of connection between nodes or neurons of different layers can be weighted higher or strengthened based on the corresponding learned feature values that are most prominent or important for a particular family of malicious content. A "weight" in various instances represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below.

In this way, for example, an entire feature space may include an embedding of vectors or other indications that are all learned or embedded in feature spaced based on learning weights corresponding to different features such that feature vectors of material maps/visual renderings with important features found in similar material maps/visual renderings are within a threshold distance of each other in feature space, whereas feature vectors corresponding to dissimilar material maps/visual renderings or material maps/visual renderings with features that are not important are not within a threshold distance of each other in the same feature space.

Figure 11:
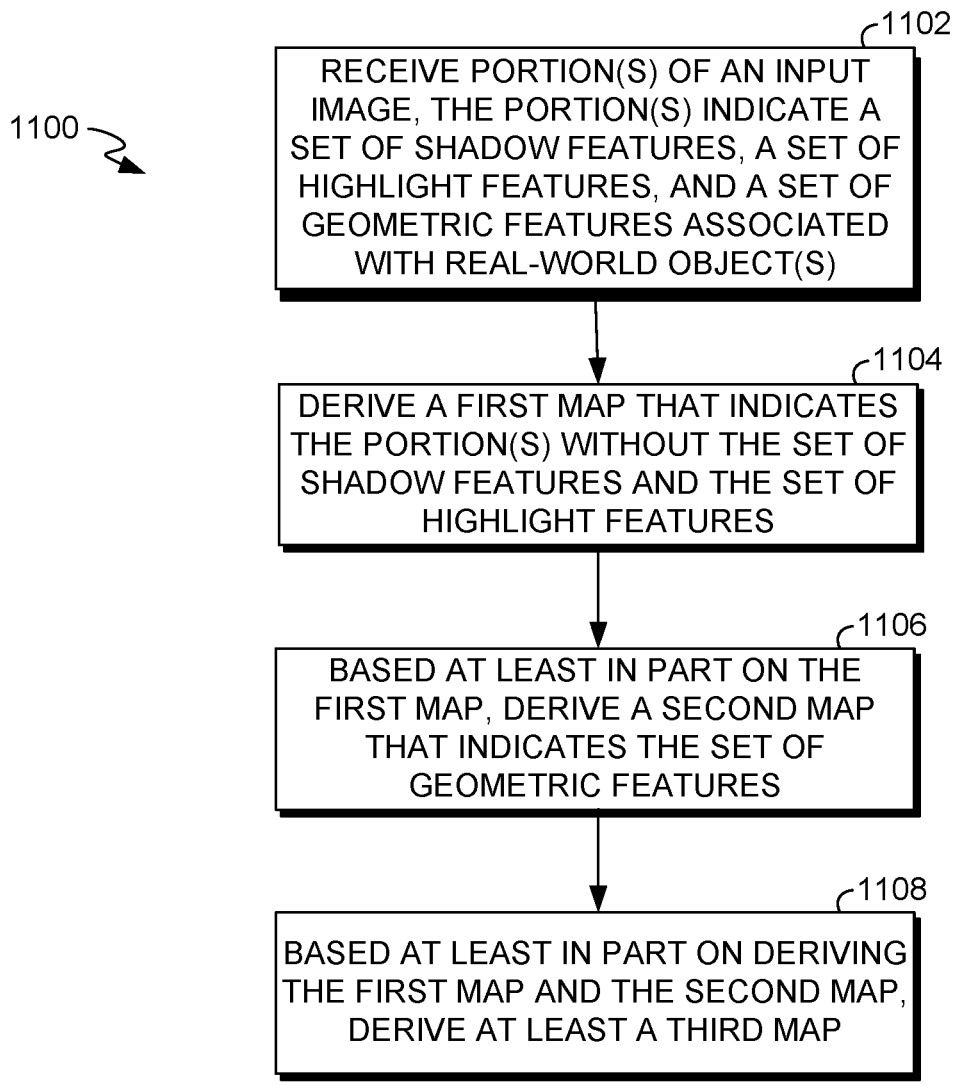
FIG. 11 is a flow diagram of an example process for deriving various maps via image-to-material translation, according to some embodiments.

FIG. 11 is a flow diagram of an example process 1100 for generating a plurality of maps via image-to-material, according to some embodiments. Per block 1102, various embodiments receive one or more portions of an input image, where the one or more portions indicate a set of shadow features (e.g., a first set of pixels indicating shadows or shading cast by a rock), a set of highlight features (e.g., a second set of pixels that represent glare or reflection lighting on the rock), and a set of geometric features associated with real-world objects (e.g., a third set of pixels representing the shape and/or texture of the rock).

In some embodiments, the input image represents a digital photograph captured at a user device. For example, a user, using a mobile device, can capture a digital photograph of a residential yard that includes various rock objects. In some embodiments the "one or more portions" represent one or more tiles of pixels, which represent a sub-portion of the input image. These embodiments are described, for example, via the tiles 204 of FIG. 2 and the pixel extraction component 102 of FIG. 1.

Per block 1104, a first map is derived (e.g., selected, predicted, or generated), where the first map indicates the one or more portions without the set of shadow features and the set of highlight features. Examples of this are described with respect to the delighting component 104 of FIG. 1 or the albedo map (e.g., the predicted albedo map 320). In some embodiments, the first map is derived via a first model and the one or more portions of the input image. For example, in some embodiments, the first model is a first U-Net machine learning model and the deriving of the first map (e.g., the albedo map 518) can be performed via the functionality of the U-Net 500 of FIG. 5.

In some embodiments, the deriving of the first map includes predicting the first map based on training a machine learning model (e.g., via the process 1000 of FIG. 10). For example, embodiments can train, prior to the receiving at block 1102, the model, where the training is based at least in part on splatting atlases on target maps and/or synthetic visual renderings, which are training input data, and wherein the rendering of the first map (and the second map per block 1106) is based on predicting the first map (and the second map) based on the training. Examples of this are described with respect to FIG. 3 (and FIG. 4). For example, the first map may represent the "predicted albedo 320 or ground truth albedo 322" of FIG. 3, where the ground truth albedo 322 (and/or the ground truth normal 420) may represent the synthetic visual renderings with splatted atlases that are within a threshold distance of the predicted first map. In some embodiments, the atlases include at least one outdoor material, from a group of outdoor materials, such as one or more stones or rocks, leaves, and sticks. These smaller objects are more likely to project unique and complex shadows, thereby improving the accuracy of the generation of the visual rendering.

Per block 1106, based at least in part on the first map, a second map that indicates the set of geometric features is derived (e.g., selected, predicted, or generated). Examples of this deriving includes functionality performed by the normal map generator 118 and/or the supplemental channel extractor 130. Examples of the second map include the predicted normal 418 or ground truth normal 420 of FIG. 4. Yet other examples include the normal 620 of FIG. 6. In various embodiments the second map is derived "based at least in part on the first map" because the second map uses the first map to generate another map. For example, the first map may include the portion(s) of the input image without shadows and highlights. Accordingly, embodiments can predict what the geometries (e.g., shape, texture) are for the objects in the first map since the objects are not occluded or masked by the shadows or highlights. This, in effect, makes it easier to infer geometric features for an object in an input image that would otherwise be covered by particular shadows or highlighting. Essentially, in various embodiments, the second map represents a raw version of objects/materials in the input image with no lighting effects to better capture the corresponding geometries.

As described above in some embodiments, the first model is a first U-Net machine learning model (e.g., 206 of FIG. 2), and the deriving of the second map includes using a second U-Net machine learning model (e.g., 210) such that the first U-Net machine learning model and the second U-Net machine learning model are a cascaded network of models. Examples of this are described with respect to FIG. 2, FIG. 6, and FIG. 7. A "cascaded" network of models refers to the concept of ensemble learning or the concatenation of various models (e.g., classifier models), where a second model uses predicted outputs of a first model to make its predictions, as indicated, for example, in FIG. 2.

Per block 1108, based at least in part on the deriving of the first map and the second map, at least a third map (e.g., a roughness map) is generated. Examples of this are described with respect to the visual rendering 804 of FIG. 8A, the reconstruction component 120 of FIG. 1, FIG. 7 (e.g., the roughness map 712), and/or the roughness estimation 224 of FIG. 2. In some embodiments, the visual rendering includes a Spatially-Varying Bidirectional Reflectance Function (SVBRDF) Physically-based Rendering (PBR) material, as described herein. In other words, an input image may include materials with a Spatially-Varying Bidirectional Reflectance Function (SVBRDF), and a visual rendering consequently includes a SVBRDF Physically-based Rendering (PBR) material used in a presentation component of a consumer application in order to capture or mimic the input image's SVBRDF material properties.

In some embodiments, the deriving of at least the third map is based at least in part on blending a low resolution version of the second map with a high resolution version of the second map. Examples of this are described with respect to the multi-scale resolution component 122 of FIG. 2 and the normal map generator 118 of FIG. 1. In some embodiments, the generating of the visual rendering is based at least in part on using only the input image and not any other input images. Examples of this are described with respect to FIG. 2 and FIG. 6, where the input image (e.g., the input image 502) and no other input images are used to generate a visual rendering. As described herein, some existing technologies use multiple input images, which is computing resource intensive. In some embodiments, the generating of the visual rendering includes stitching together a plurality of tiles representing the input image, as described above with respect to the reconstruction component 120 (e.g., the stitching component 128), for example.

In some embodiments, block 1108 is based on aggregating an albedo map, normal map, height map, and ambient occlusion map into a roughness map, as described, for example, with respect to FIG. 2 and FIG. 7. In some embodiments, subsequent to the generation of the visual rendering, pixel values of the visual rendering are changed based on receiving user input, where the changing is at least partially indicative of changing shadow or lighting characteristics of the visual rendering. Examples of this are described with respect to FIG. 8A, where the visual rendering 804 in FIG. 8B is changed to include more shadows relative to the visual rendering 804 in FIG. 8A.

Various embodiments described herein are directed to reconstructing a spatially-varying bidirectional reflectance distribution function starting from aa single high-resolution picture of a quasi-planar surface captured in natural lighting (e.g., without flash) conditions using any kind of camera device. Various embodiments described herein us a pair of deep neural nets combined with efficient optimizations and makes possible the removal of shades, projected shadows, and highlights present when capturing a highly irregular surface, thereby allowing to properly reconstruct the underlying colorimetric and geometric parameters of the material. To do so, various embodiments described herein train two cascaded U-Nets on physically-based material models (as opposed to 2d images), rendered under various lighting (and therefore shading/highlighting) conditions, to infer the spatially-varying albedo and normal maps. Various embodiments described herein processes relatively small image tiles (512×512 pixels) and a solution is proposed to handle larger image resolutions by solving a Poisson system across these tiles. Various embodiments complete this pipeline with optimization methods for retrieving the height, ambient occlusion, and roughness maps.

Exemplary Operating Environments

Figure 12:
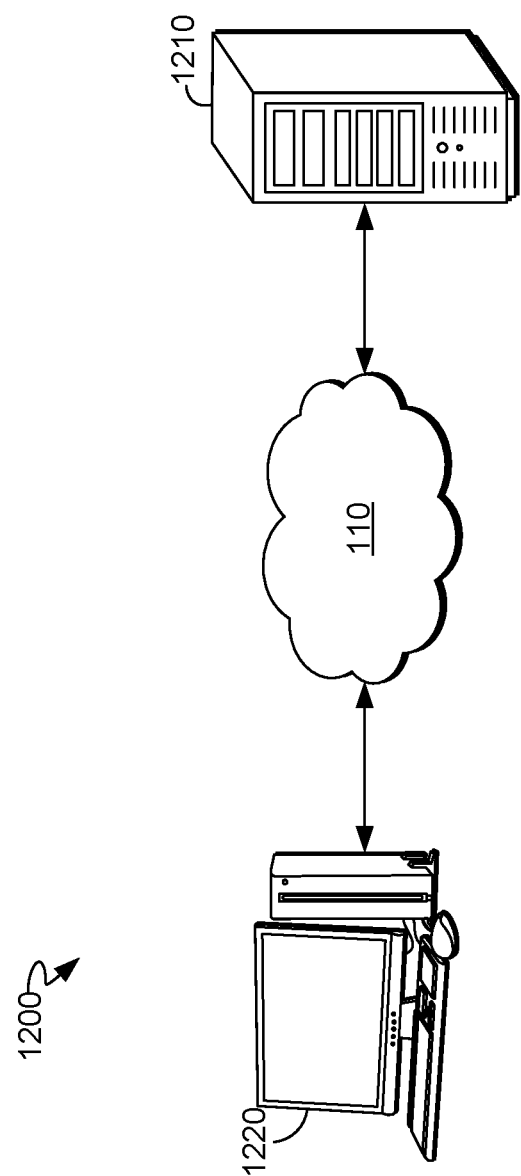

Turning now to FIG. 12, a schematic depiction is provided illustrating an example computing environment 1200, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1210 that represent nodes in a cloud computing network. Various functions described herein as being performed by one or more entities may be carried out by hardware, firmware, and/or software. For instance, various functions may be carried out by a processor executing instructions stored in memory.

The environment 1200 depicted in FIG. 12 includes a prediction server ("server") 1210 that is in communication with a network 110. The environment 1200 further includes a client device ("client") 1220 that is also in communication with the network 110. Among other things, the client 1220 can communicate with the server 1210 via the network 110, and generate for communication, to the server 1210, a request to generate one or more visual renderings from an input image (image-to-material translation). In various embodiments, the client 1220 is embodied in a computing device, which may be referred to herein as a client device or user device, such as described with respect to the computing device 1300 of FIG. 13.

In some embodiments, each component in FIG. 1 is included in the server 1210 and/or the client device 1220. Alternatively, in some embodiments, the components of FIG. 1 are distributed between the server 1210 and client device 1220.

The server 1210 can receive the request communicated from the client 1220, and can search for relevant data via any number of data repositories to which the server 1210 can access, whether remotely or locally. A data repository can include one or more local computing devices or remote computing devices, each accessible to the server 1210 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1210 is embodied in a computing device, such as described with respect to the computing device 1300 of FIG.13.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

Looking now to FIG. 13, computing device 1300 includes a bus 10 that directly or indirectly couples the following devices: memory 12, one or more processors 14, one or more presentation components 16, input/output (i/O) ports 18, input/output components 20, and an illustrative power supply 22. Bus 10 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an i/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1300 represents the client device 1220 and/or the server 1210 of FIG. 12.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 12 or i/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 1000 of FIG. 10, or any functionality described with respect to FIGS. 1 through 12.

i/O ports 18 allow computing device 1000 to be logically coupled to other devices including i/O components 20, some of which may be built in. Illustrative components include a microphone, joystick, game pad, satellite dish, scanner, printer, wireless device, etc. The i/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized system, the system comprising:
one or more processors; and
computer storage memory having computer-executable instructions stored thereon which, when executed by the one or more processors, implement a method comprising:
receiving one or more portions of an input image, the one or more portions indicate a set of shadow features, a set of highlight features, and a set of geometric features associated with one or more real-world objects;
deriving, via a first model and the one or more portions of the input image, an albedo map that indicates the one or more portions without the set of shadow features and the set of highlight features, the albedo map being a first data object and the one or more portions of the input image being a second data object;

deriving a normal map from the albedo map, the normal map indicates the set of geometric features, the second map being a third data object; and based at least in part on the deriving of the first map and the deriving of the second map, deriving at least a third map, wherein the deriving of the third map includes aggregating the albedo map and the normal map into a roughness map.

2. The system of claim 1, wherein the first model is a first U-Net machine learning model, and wherein the deriving of the normal map includes using a second U-Net machine learning model, and wherein the first U-Net machine learning model and the second U-Net machine learning model are a cascaded network of models.

3. The system of claim 1, wherein the albedo map is a first map of a physically based rendering (PBR) material and the normal map is a second map of the PBR material and the roughness map is a third map of the PBR material.

4. The system of claim 1, wherein the one or more portions of the input image include materials with a Spatially-Varying Bidirectional Reflectance Function (SVBRDF), and wherein the visual rendering consequently includes a SVBRDF Physically-based Rendering (PBR) material used in a presentation component of a consumer application.

5. The system of claim 1, the method further comprising training, prior to the receiving, the model, wherein the training is based at least in part on inputs that are visual renderings of synthetics procedural materials, and wherein at least a portion of the procedural materials are augmented by procedural atlases splatting before generating the renderings.

6. The system of claim 5, wherein the atlases include at least one outdoor material atlas, from a group of one or more outdoor atlases including: stones, leaves, and sticks.

7. The system of claim 1, wherein the deriving of the normal map is based at least in part on blending a version of the normal map predicted on a low resolution version of the input image with multiple tiles of the normal map predicted on multiple tiles within the input image at high resolution.

8. The system of claim 1, wherein the deriving of the albedo map, the normal map, and the roughness map is based at least in part on using only the input image and not any other images.

9. The system of claim 1, wherein the input image represents a digital photograph captured at a user device.

10. The system of claim 1, wherein the one or more portions of the input image represents a tile of pixels representing a sub-portion of the input image, and wherein the deriving of the albedo map, the normal map, and the roughness map includes stitching together a plurality of predictions generated on each tile represented in the input image.

11. The system of claim 1, wherein the deriving of the roughness map includes aggregating the albedo map, the normal map, a height map, and an ambient occlusion map into the roughness map.

12. The system of claim 1, the method further comprising changing, subsequent to the deriving, pixel values of the visual rendering based on receiving user input, wherein the changing is at least partially indicative of changing shadow or lighting characteristics of the visual rendering.

13. A computer-implemented method comprising:
receiving one or more portions of an input image, the one or more portions indicate a set of shadow features, a set of highlight features, and a set of geometric features associated with one or more real-world objects;
deriving an albedo map that indicates the one or more portions without at least one of: the set of shadow features and the set of highlight features, the albedo map being a first data object that is different than the one or more portions of the input image;
deriving a normal map from the albedo map, the normal map indicates the set of geometric features, the normal map further being a second data object that is different than the one or more portions of the input image and the albedo map; and
merging the albedo map and the normal map, into a roughness map.

14. The method of claim 13, wherein the deriving of the albedo map includes using a first U-Net machine learning model, and wherein the deriving of the normal map includes using a second U-Net machine learning model, and wherein the first U-Net machine learning model and the second U-Net machine learning model are a cascaded network of models.

15. The method of claim 13, wherein the normal map is used to generate a visual rendering that includes a Spatially-Varying Bidirectional Reflectance Function (SVBRDF) Physically-based Rendering (PBR) material.

16. The method of claim 1, further comprising training, prior to the receiving, a model, wherein the training is based at least in part on inputs that are visual renderings of synthetics procedural materials, and wherein at least a portion of the procedural materials are augmented by procedural atlases splatting before generating the renderings.

17. The method of claim 1, wherein the map is derived based on aggregating the albedo map, the normal map, a height map, and an ambient occlusion map into the roughness map.

18. A computerized system, the system comprising:
a delighting means for deriving a shadow map that indicates only one or more shadow features of an input image, wherein the shadow map does not include objects or materials that do not represent shading characteristics of the input image, the input image further includes a set of geometric features, the shadow map being a first data object that is different than the input image;
a baseline channel extracting means for deriving a normal map using the shadow map, the normal map indicates the set of geometric features, the normal map further being a second data object that is different than the input image; and
a supplemental channel extracting means for deriving a roughness map based at least in part on merging the shadow map and the normal map into the roughness map.

19. The system of claim 18, wherein the deriving of the shadow map includes using a first U-Net machine learning model, and wherein the deriving of the normal map includes using a second U-Net machine learning model, and wherein the first U-Net machine learning model and the second U-Net machine learning model are a cascaded network of models.

* * * * *

UNITED STATES PATENT AND TRADEMARK OFFICE
CERTIFICATE OF CORRECTION

PATENT NO. : 11,670,042 B2
APPLICATION NO. : 17/201721
DATED : June 6, 2023
INVENTOR(S) : Tamy Boubekeur et al.

It is certified that error appears in the above-identified patent and that said Letters Patent is hereby corrected as shown below:

In the Claims

Claim 17, Column 32, Line 34, after "the" insert -- roughness --.

Signed and Sealed this
Twenty-seventh Day of February, 2024

Katherine Kelly Vidal
*Director of the United States Patent and Trademark Office*